(12) United States Patent
Toyama

(10) Patent No.: US 9,170,406 B2
(45) Date of Patent: Oct. 27, 2015

(54) ZOOM LENS AND IMAGING APPARATUS

(71) Applicant: FUJIFILM Corporation, Tokyo (JP)

(72) Inventor: Nobuaki Toyama, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/330,007

(22) Filed: Jul. 14, 2014

(65) Prior Publication Data

US 2015/0015970 A1 Jan. 15, 2015

(30) Foreign Application Priority Data

Jul. 12, 2013 (JP) ................................. 2013-146208

(51) Int. Cl.
*G02B 15/00* (2006.01)
*G02B 15/14* (2006.01)
*G02B 15/173* (2006.01)
*G02B 13/00* (2006.01)

(52) U.S. Cl.
CPC .............. *G02B 15/14* (2013.01); *G02B 13/009* (2013.01); *G02B 15/00* (2013.01); *G02B 15/173* (2013.01)

(58) Field of Classification Search
CPC .... G02B 13/009; G02B 15/173; G02B 15/00; G02B 15/14
USPC .......................... 359/649–651, 676, 683–690
See application file for complete search history.

(56) References Cited

U.S. PATENT DOCUMENTS

| 5,966,246 A | 10/1999 | Yoshikawa |
| 2009/0190233 A1* | 7/2009 | Muramatsu et al. .......... 359/682 |
| 2013/0271643 A1* | 10/2013 | Inomoto ....................... 348/345 |

FOREIGN PATENT DOCUMENTS

| JP | 06-242378 | 9/1994 |
| JP | 10-62686 | 3/1998 |

* cited by examiner

*Primary Examiner* — Thomas K Pham
*Assistant Examiner* — Mitchell Oestreich
(74) *Attorney, Agent, or Firm* — Young & Thompson

(57) ABSTRACT

A zoom lens includes: a first lens group having a positive refractive power which is fixed while changing magnification; a second lens group constituted by two or more magnification changing groups; an aperture stop; and a third lens group having a positive refractive power which is fixed while changing magnification, provided in this order from an object side. The magnification changing groups respectively move along an optical axis while changing magnification from a wide angle end to a telephoto end. The zoom lens satisfies the following conditional formula:

$$u'/u < 0.5 \qquad (1)$$

wherein u is the angle of inclination of a paraxial chief ray of light that enters the lens surface most toward the object side within the first lens group, and u' is the angle of inclination of the paraxial chief ray of light that exits the lens surface most toward an image side within the first lens group.

15 Claims, 26 Drawing Sheets

FIG.1
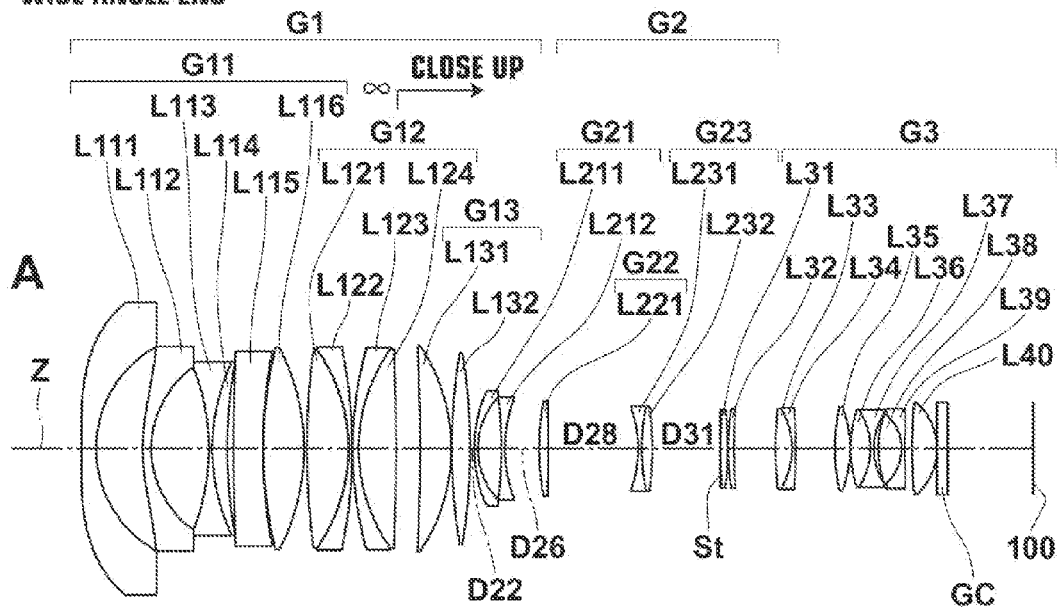
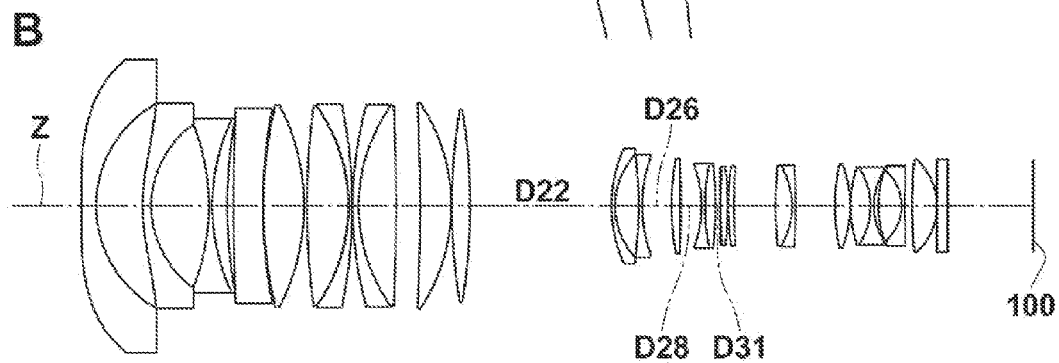

FIG.2
EXAMPLE 2
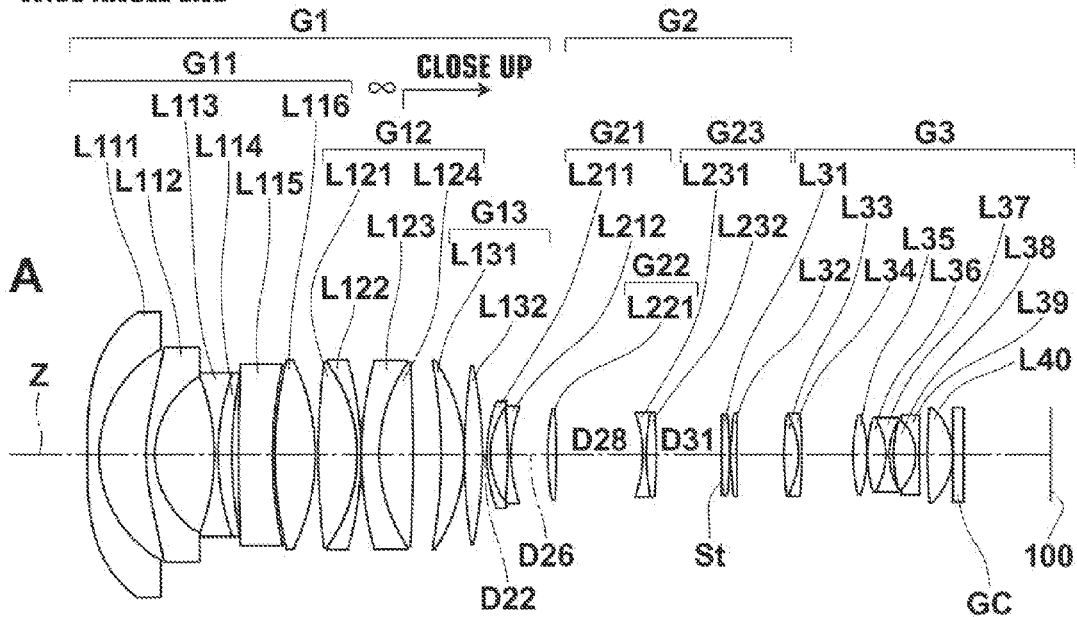
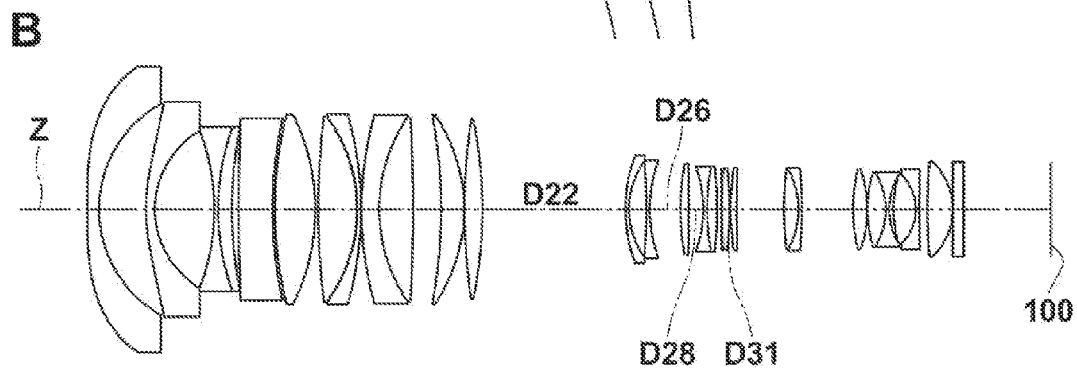

FIG.3
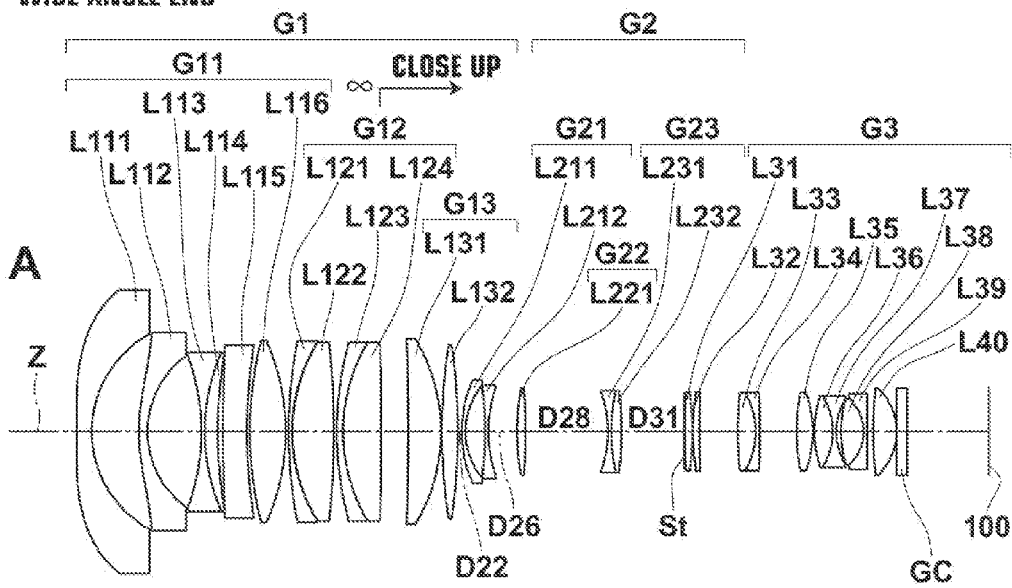
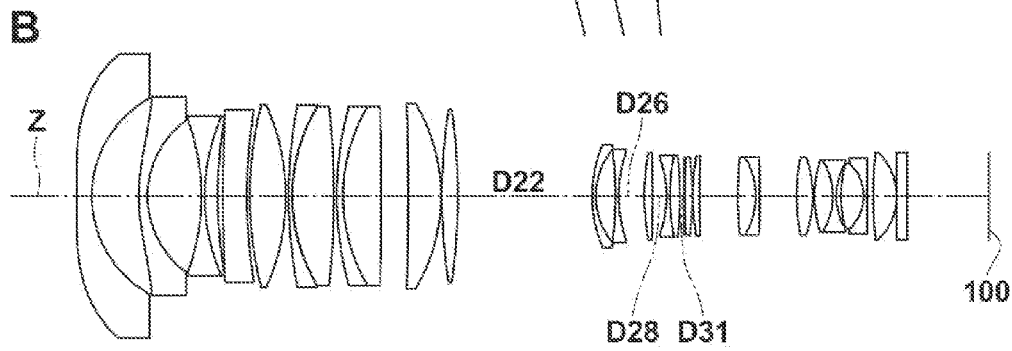

FIG.5
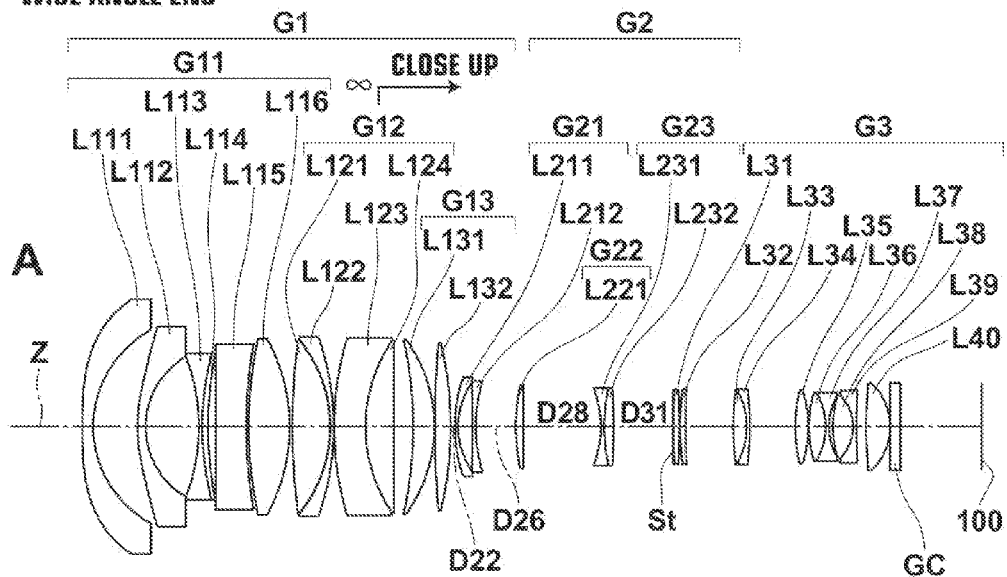
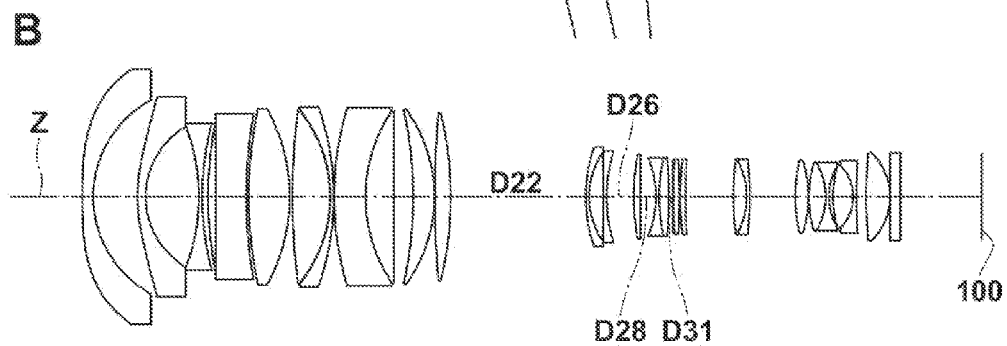

FIG.6
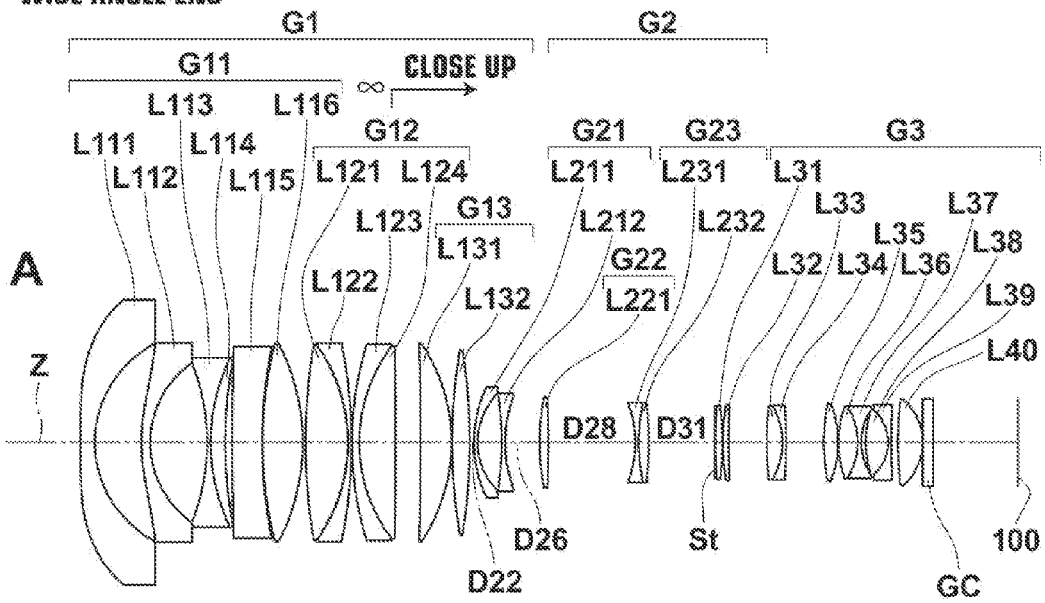
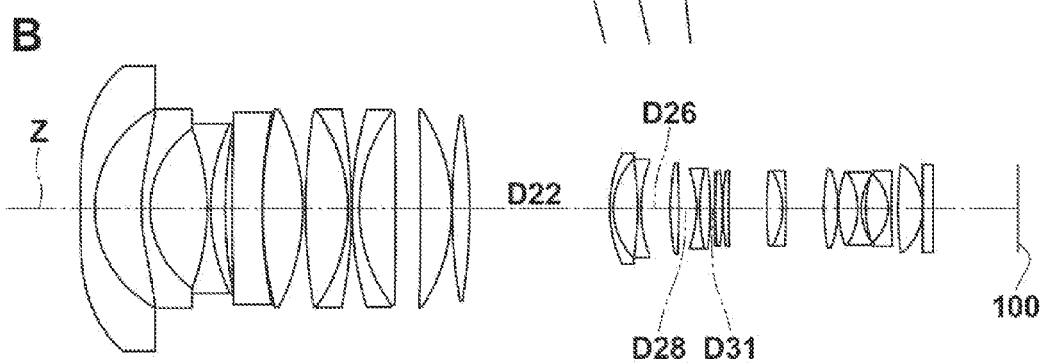

FIG.7
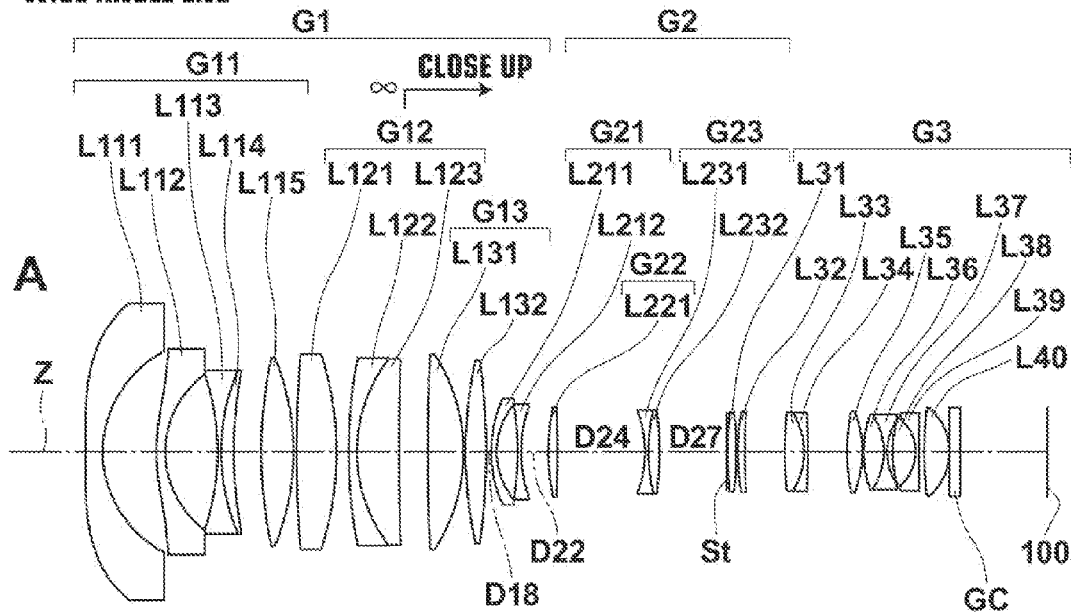
EXAMPLE 7
A — WIDE ANGLE END
B — TELEPHOTO END
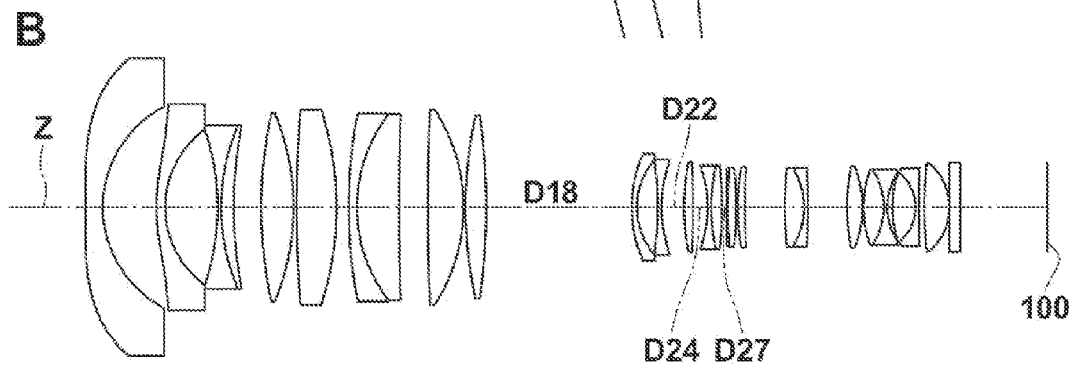

FIG.8
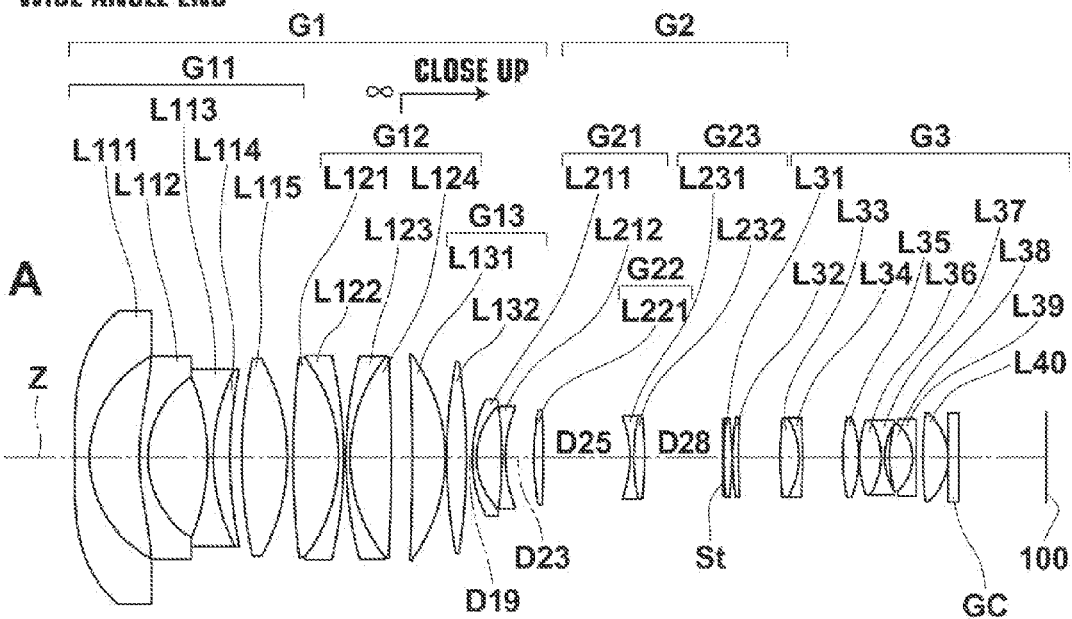
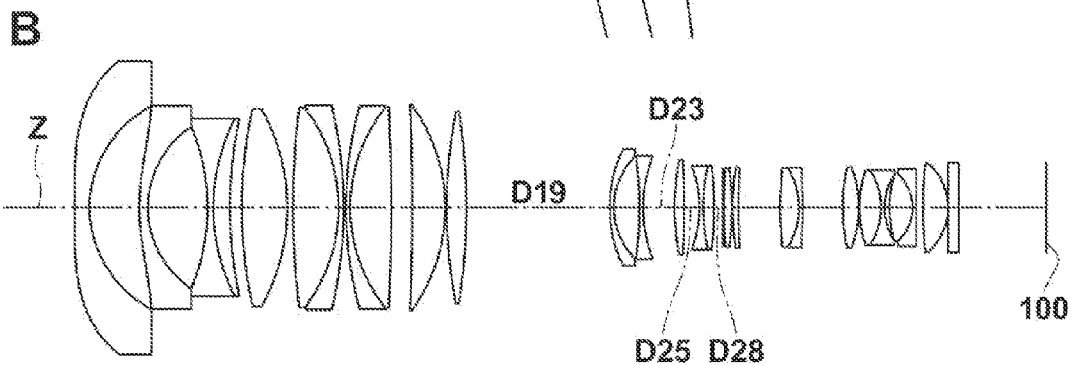

ZOOM LENS AND IMAGING APPARATUS

CROSS REFERENCE TO RELATED APPLICATIONS

The present application claims priority under 35 USC §119 to Japanese Patent Application No. 2013-146208, filed on Jul. 12, 2013. The above application is hereby expressly incorporated by reference in its entirety, into the present application.

TECHNICAL FIELD

The present invention is related to a zoom lens for use in electronic cameras such as a digital camera, a video camera, a broadcast camera, a cinematic camera, and a surveillance camera. The present invention is also related to an imaging apparatus equipped with the zoom lens.

BACKGROUND ART

There are often cases in which a zoom lens is mounted in electronic cameras such as a digital camera, a video camera, a broadcast camera, a cinematic camera, and a surveillance camera. Zoom lenses having extremely wide angles of view are desired, particularly for electronic cameras such as broadcast cameras and cinematic cameras. For this reason, zoom lenses constituted by four lens groups including first through fourth lens groups that correct various aberrations and are designed to have wider angles of view have been proposed (refer to Japanese Unexamined Patent Publication Nos. 6(1994)-242378 and 10(1998)-062686).

DISCLOSURE OF THE INVENTION

However, zoom lenses having wider angles of view than those disclosed in Japanese Unexamined Patent Publication Nos. 6(1994)-242378 and 10(1998)-062686 are desired for use in electronic cameras such as broadcast cameras and cinematic cameras.

The present invention has been developed in view of the foregoing circumstances. The object of the present invention is to provide a zoom lens that achieves a widening of the angle of view, while correcting various aberrations more favorably.

A zoom lens of the present invention substantially consists of:

a first lens group having a positive refractive power which is fixed while changing magnification;

a second lens group constituted by two or more magnification changing groups;

an aperture stop; and a third lens group having a positive refractive power which is fixed while changing magnification, provided in this order from an object side;

the magnification changing groups respectively moving along an optical axis while changing magnification from a wide angle end to a telephoto end; and the zoom lens satisfying the following conditional formula.

$$u'/u<0.5 \quad (1)$$

wherein u is the angle of inclination of a paraxial chief ray of light that enters the lens surface most toward the object side within the first lens group, and u' is the angle of inclination of the paraxial chief ray of light that exits the lens surface most toward an image side within the first lens group.

Note that the zoom lens of the present invention substantially consists of the first lens group, the second lens group constituted by two or more magnification changing groups, the aperture stop, and the third lens group. The zoom lens of the present invention may also include lenses that practically have no power, optical elements other than lenses such as a cover glass, and mechanical components such as lens flanges, a lens barrel, an imaging element, a camera shake correcting mechanism, etc., in addition to these lens groups.

In addition, in the present invention, the surface shapes of lenses, such as convex, concave, planar, biconcave, meniscus, biconvex, planoconvex, and planoconcave, as well as the signs of the refractive powers of lenses (positive and negative) are considered in the paraxial region for lenses that include aspherical surfaces unless particularly noted. In addition, in the present invention, the signs of radii of curvature are positive in the case that a surface shape is convex toward the object side, and negative in the case that a surface shape is convex toward the image side.

Note that in the zoom lens of the present invention, it is preferable that a 111 lens having a negative refractive power and a concave surface at least toward the image side is provided most toward the object side within the first lens group, and a 112 lens having a negative refractive power and a concave surface at least toward the image side is provided immediately adjacent the 111 lens toward the image side thereof; and for the surface of the 111 lens toward the object side to be aspherical.

In addition, in the zoom lens of the present invention, it is preferable that a 111 lens having a negative refractive power and a concave surface at least toward the image side is provided most toward the object side within the first lens group, and a 112 lens having a negative refractive power and a concave surface at least toward the image side is provided immediately adjacent the 111 lens toward the image side thereof; and for the surface of the 112 lens toward the object side to be aspherical.

In addition, in the zoom lens of the present invention, it is preferable for the lens most toward the image side within the first lens group to be a lens having a positive refractive power and a convex surface toward the object side.

In addition, in the zoom lens of the present invention, it is preferable for the first lens group to be constituted by a 11 lens group having a negative refractive power, a 12 lens group having a positive refractive power, and a 13 lens group having a positive refractive power, provided in this order from the object side; and for only the 12 lens group to move toward the image side when focusing from an infinite distance to a close distance.

In addition, in the zoom lens of the present invention, it is preferable for the 11 lens group to be constituted by five or more lenses that include three or more lenses having negative refractive powers.

In addition, in the zoom lens of the present invention, it is preferable for the 12 lens group to be constituted at least by a lens having a positive refractive power, and a cemented lens formed by a lens having a negative refractive power and a lens having a positive refractive power, provided in this order from the object side.

In addition, in the zoom lens of the present invention, it is preferable for the 12 lens group to be constituted by a lens having a positive refractive power, a lens having a negative refractive power, and a cemented lens formed by a lens having a negative refractive power and a lens having a positive refractive power, provided in this order from the object side.

In addition, in the zoom lens of the present invention, it is preferable for the 13 lens group to be constituted at least by two lenses having positive refractive powers, provided in this order from the object side.

In addition, in the zoom lens of the present invention, it is preferable for the second lens group to be constituted by a 21 lens group having a negative refractive power, a 22 lens group having a positive refractive power, and a 23 lens group having a negative refractive power; and for the distances among the 21 lens group, the 22 lens group, and the 23 lens group to change to change magnification.

In addition, in the zoom lens of the present invention, it is preferable for the angle of view to be greater than 110 degrees.

In addition, in the zoom lens of the present invention, it is preferable for the Conditional Formulae (1-1) through (1-3) to be satisfied.

$$u'/u < 0.4 \tag{1-1}$$

$$0.15 < u'/u < 0.5 \tag{1-2}$$

$$0.15 < u'/u < 0.4 \tag{1-3}$$

An imaging apparatus of the present invention is characterized by being equipped with the zoom lens of the present invention described above.

The zoom lens according to the present invention substantially consists of the first lens group having a positive refractive power which is fixed while changing magnification; the second lens group constituted by two or more magnification changing groups; the aperture stop; and the third lens group having a positive refractive power which is fixed while changing magnification, provided in this order from an object side. The zoom lens is configured such that the magnification changing groups respectively move along the optical axis while changing magnification from a wide angle end to a telephoto end, and such that Conditional Formula (1) is satisfied. Therefore, the zoom lens can be that having an extremely wide angle of view exceeding 110 degrees, for use in electronic cameras such as a broadcast camera and a cinematic camera. In addition, the total length of the lens system and the F number can be kept constant through the entire zoom range, and variations in the angle of view during focusing operations can be suppressed. Further, because the entrance pupil is moved forward, miniaturization in the radial direction and reduction in weight can be achieved. Particularly by satisfying Conditional Formula (1), variations in aberrations can be reduced, even in a zoom lens having an extremely wide angle of view.

The imaging apparatus of the present invention is equipped with the zoom lens of the present invent ion. Therefore, the imaging apparatus of the present can be configured to be compact and to have high performance, and favorable images can be obtained employing an imaging element.

BRIEF DESCRIPTION OF THE DRAWINGS

FIG. 1 is a collection of sectional diagrams that illustrate a first example of the configuration of a zoom lens according to an embodiment of the present invention, and corresponds to a lens of Example 1.

FIG. 2 is a collection of sectional diagrams that illustrate a second example of the configuration of a zoom lens according to an embodiment of the present invention, and corresponds to a lens of Example 2.

FIG. 3 is a collection of sectional diagrams that illustrate a third example of the configuration of a zoom lens according to an embodiment of the present invention, and corresponds to a lens of Example 3.

FIG. 5 is a collection of sectional diagrams that illustrate a fifth example of the configuration of a zoom lens according to an embodiment of the present invention, and corresponds to a lens of Example 5.

FIG. 6 is a collection of sectional diagrams that illustrate a sixth example of the configuration of a zoom lens according to an embodiment of the present invention, and corresponds to a lens of Example 6.

FIG. 7 is a collection of sectional diagrams that illustrate a seventh example of the configuration of a zoom lens according to an embodiment of the present invention, and corresponds to a lens of Example 7.

FIG. 8 is a collection of sectional diagrams that illustrate an eighth example of the configuration of a zoom lens according to an embodiment of the present invention, and corresponds to a lens of Example 8.

BEST MODE FOR CARRYING OUT THE INVENTION

Figure 4:
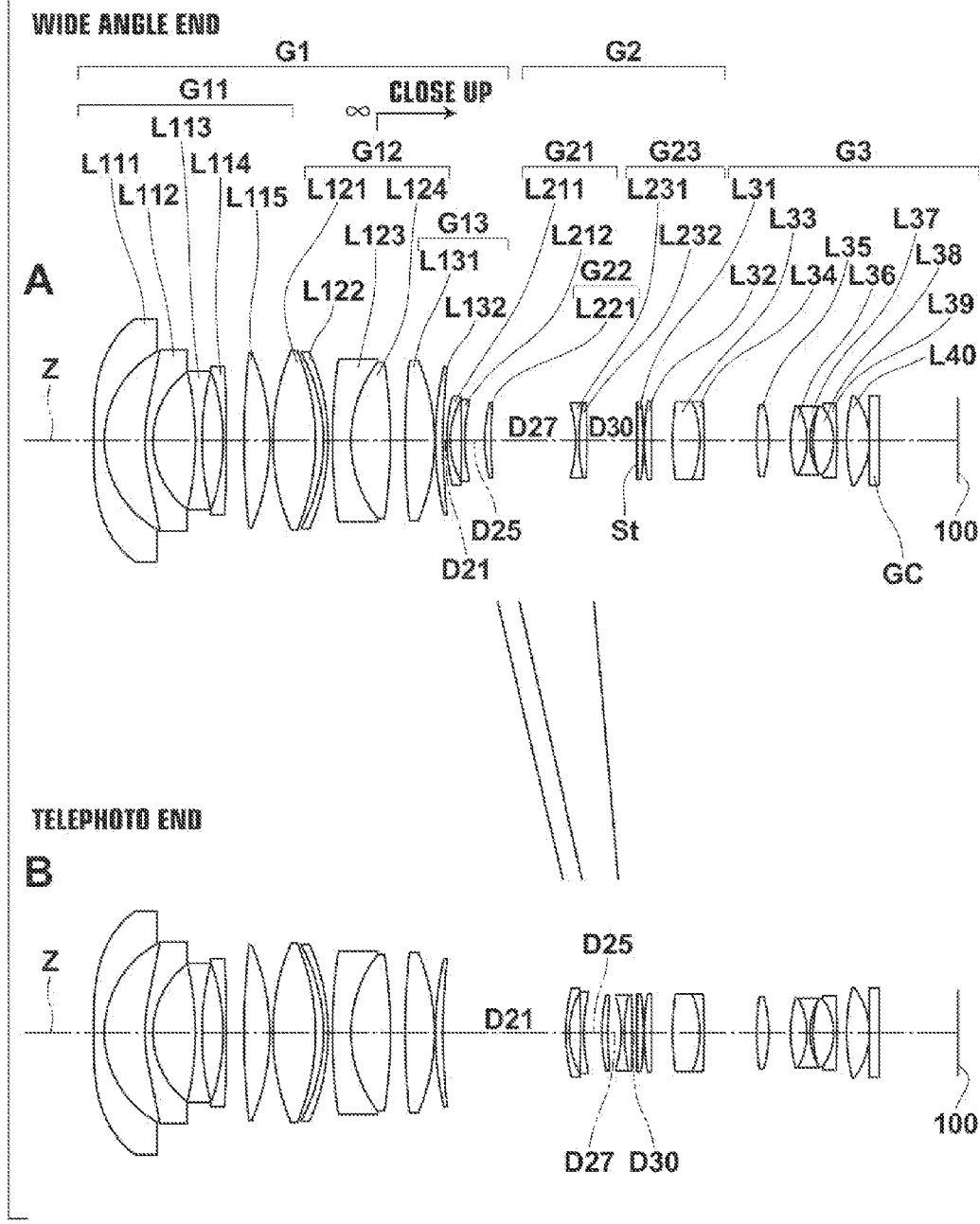
FIG. 4 is a collection of sectional diagrams that illustrate a fourth example of the configuration of a zoom lens according to an embodiment of the present invention, and corresponds to a lens of Example 4.

Hereinafter, embodiments of the present invention will be described in detail with reference to the attached drawings. A and B of FIG. 1 illustrate a first example of the configuration of a zoom lens according to an embodiment of the present invention. This example corresponds to the lens configuration of Numerical Example 1 to be described later. Note that A of FIG. 1 illustrates the arrangement of the optical system at the wide angle end (shortest focal length state), and B of FIG. 1 illustrates the arrangement of the optical system at the telephoto end (longest focal length state). Similarly, A and B of FIG. 2 through A and B of FIG. 8 illustrate second through eighth examples of lens configurations that correspond to Numerical Examples 2 through 8. In A and B of FIG. 1 through A and B of FIG. 8, the symbol Di represents the distances between an ith surface and an i+1st surface along an optical axis Z. Note that with respect to the symbol Di, only distances between surfaces that change accompanying changes in imaging magnification are indicated thereby (D22, D26, D28, and D31 in FIG. 1).

This zoom lens is constituted by a first lens group G1 having a positive refractive power which is fixed while changing magnification, a second lens group G2 constituted by two or more magnification changing groups; and a third lens group G3 having a positive refractive power which is fixed while changing magnification, provided along the optical axis Z in this order from an object side. It is preferable for an optical aperture stop St to be provided between the second lens group G2 and the third lens group G3 in the vicinity of the third lens group G3 toward the object side thereof.

The first lens group G1 is constituted by a 11 lens group G11 having a negative refractive power, a 12 lens group G12 having a positive refractive power, and a 13 lens group G13, provided in this order from the object side. When focus is changed from an object at infinity to an object at a limited distance, the 12 lens group G12 moves along the optical axis to perform focusing operations.

The 11 lens group G11 is constituted by five or more lenses that include three or more lenses having negative refractive powers. In addition, in the present embodiment, the 11 lens group G11 includes a 111 lens having a negative refractive power and a concave surface at least toward the image side, and a 112 lens group having a negative refractive power and a concave surface at least toward the image side, provided in this order from the object side. The lens within the first lens group G1 most toward the image side is a lens having a positive refractive power and a convex surface toward the object side. In the present embodiment, the 11 lens group G11 is constituted by a biconcave 111 lens L111 having a negative refractive power, a 112 lens L112 having a negative refractive power and a negative meniscus shape with a concave surface toward the image side, a cemented lens formed by a biconcave lens L113 and a lens L114 having a positive meniscus shape with a convex surface toward the object side, a lens L115 having a negative meniscus shape with a convex surface toward the object side, and a biconvex lens L116, provided in this order from the object side. Note that the surfaces of the 111 lens L111 and the 112 lens L112 toward the object side are aspherical.

The 12 lens group G12 is constituted at least by a lens having a positive refractive power and a cemented lens formed by a lens having a negative refractive power and a lens having a positive refractive power. Note that it is preferable for the 12 lens group G12 to be constituted at least by a lens having a positive refractive power, a lens having a negative refractive power, and a cemented lens formed by a lens having a negative refractive power and a lens having a positive refractive power. In the present embodiment, the 12 lens group G12 is constituted by a biconvex lens L121, a lens L122 of a negative meniscus shape having a convex surface toward the image side, and a cemented lens formed by a lens 123 of a negative meniscus shape having a convex surface toward the object side and a biconvex lens L124, provided in this order from the object side.

The 13 lens group G13 is constituted by at least two lenses having positive refractive powers, provided in this order from the object side. In the present embodiment, the 13 lens group G13 is constituted by a lens L131 of a positive meniscus shape having a convex surface toward the image side and a biconvex lens L132, provided in this order from the object side.

The second lens group G2 is constituted by a 21 lens group G21 having a negative refractive power, a 22 lens group G22 having a positive refractive power, and a 23 lens group G23 having a negative refractive power, provided in this order from the object side.

The 21 lens group G21 is constituted by a lens L211 having a negative meniscus shape with a convex surface toward the object side and a biconcave lens L212. Note that the surface of the lens L211 toward the object side is aspherical.

The 22 lens group G22 is constituted by a single biconvex lens L211.

The 23 lens group G23 is constituted by a cemented lens formed by a biconcave lens L231 and a biconvex lens L232.

The third lens group G3 is constituted by a biconvex lens L31, a lens L32 having a positive meniscus shape with a convex surface toward the object side, a cemented lens formed by a biconvex lens L33 and a lens L34 having a negative meniscus shape with a convex surface toward the image side, a biconvex lens L35, a cemented lens formed by a biconvex lens L36 and a biconcave lens L37, a cemented lens formed by a biconvex lens L38 and a biconcave lens L39, and a biconvex lens L40.

The zoom lens of the present embodiment may be mounted on imaging devices such as a cinematic camera and a mirrorless interchangeable lens camera. An imaging element 100 such as a CCD (Charge Coupled Device) and a CMOS (Complementary Metal Oxide Semiconductor) is provided at an image formation plane (imaging surface) of a camera having the zoom lens mounted thereon. The imaging element 100 outputs image signals corresponding to optical images formed by the zoom lens of the present embodiment. An imaging apparatus according to an embodiment of the present invention is constituted at least by the zoom lens and the imaging element 100. Various optical members GC may be provided between the third lens group G3 and the imaging element 100, depending on the configuration of the camera to which the lens is applied. A planar optical member such as a cover glass for protecting the imaging surface and an infrared cutoff filter may be provided, for example. Note that A and B of FIG. 1 through A and B of FIG. 8 also illustrate the imaging element 100 and the optical member GC.

In this zoom lens, the first lens group G1 and the third lens group G3 are fixed while changing magnification. Magnification is changed by moving the 21 lens group G21, the 22 lens group G22, and the 23 lens group G23 along the optical axis Z, to change the distances among each of the groups. That is, the 21 lens group G21, the 22 lens group G22, and the 23 lens group G23 move along the paths illustrated by the solid lines from the state illustrated in A of FIG. 1 to the state illustrated in B of FIG. 1, when changing magnification from the wide angle end to the telephoto end.

In greater detail, the 21 lens group G21, the 22 lens group G22, and the 23 lens group G23 are moved while changing magnification from the wide angle end to the telephoto end such that the distance between the first lens group G1 and the 21 lens group G21 increases, the distance between the 21 lens group G21 and the 22 lens group G22 decreases, the distance between the 22 lens group G22 and the 23 lens group G23 decreases, and the distance between the 23 lens group G23 and the third lens group G3 decreases. By moving the lens groups in this manner, magnification can be effectively changed by these lens groups.

The zoom lens of the present embodiment satisfies the following conditional formula.

$$u'/u<0.5 \quad (1)$$

wherein u is the angle of inclination of a paraxial chief ray of light that enters the lens surface most toward the object side within the first lens group G1, and u' is the angle of inclination of the paraxial chief ray of light that exits the lens surface most toward the image side within the first lens group G1.

Here, the paraxial region will be explained. The paraxial region is a region in which the incident angles of rays of light that enter a lens surface is sufficiently small. For the sake of explanation, if the length of a normal line from the peak of a refractive surface of a lens to a ray of light is designated as M and the angle between the ray of light and the optical axis is U, the position sk' at which a meridional ray emitted from the optical axis or from a point extremely close to the optical axis intersects with the optical axis after passing through the final surface k of the lens is represented by sk'=Mk'/sin U'. Note that the apostrophe "'" indicates "after refraction". As the incident height Y into the lens becomes smaller, Mk'/sin U' will become 0/0, and the intersection point exists as the limit value thereof (*Lens Design Optics*, N. Nakagawa, Tokai University Press, pp. 8-15, Aug. 31, 1986). Note that the paraxial tracking formula is excerpted from this document.

Figure 9:
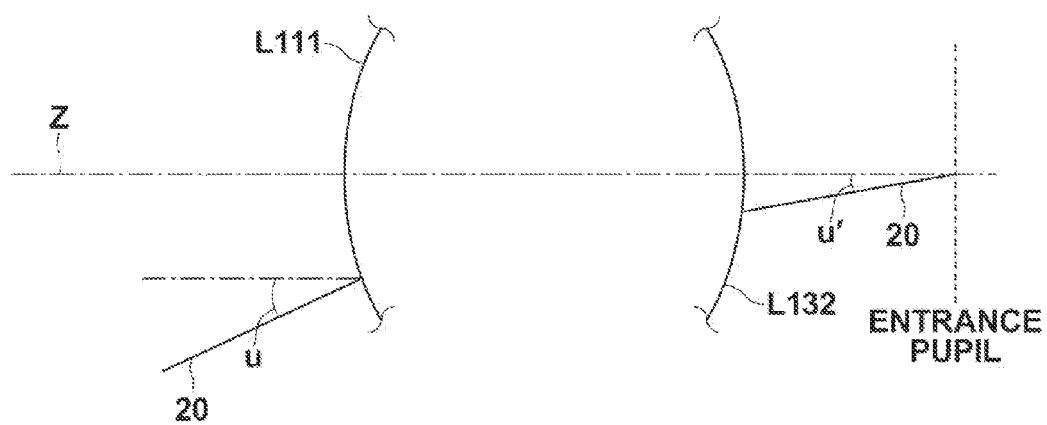
FIG. 9 is a diagram for explaining the angle of inclination of a paraxial chief ray of light.

FIG. 9 is a diagram that illustrates the optical path of a paraxial chief ray of light in the paraxial region of the lens. As illustrated in FIG. 9, the paraxial chief ray of light 20 is a chief ray of light of a light beam that passes through the paraxial region. In the present embodiment, the lens most toward the object side within the first lens group G1 is the lens L111, and the lens most toward the image side within the first lens group G1 is the lens L132. As illustrated in FIG. 9, the angle of inclination u is an angle formed between the paraxial chief ray of light 20 that enters the lens L111 and the optical axis Z, and the angle of inclination u' is an angle formed between the paraxial chief ray of light 20 that exits the lens L132 and the optical axis Z.

By adopting such a configuration, the zoom lens of the present embodiment can be a zoom lens having an extremely wide angle of view exceeding 110 degrees in an electronic camera, such as a broadcast camera and a digital cinematic camera. In addition, the total length of the lens system and the F number can be kept constant through the entire zoom range, and variations in the angle of view during focusing operations can be suppressed. Further, because the entrance pupil is moved forward, miniaturization in the radial direction and reduction in weight can be achieved.

In addition, by satisfying Conditional Formula (1), variations in aberrations can be reduced, even in a zoom lens having an extremely wide angle of view.

In addition, the first lens group G1 is constituted by the 111 lens L111 having a negative refractive power and a concave surface at least toward the image side, and the 112 lens L112 having a negative refractive power and a concave surface at least toward the image side; and the surface of the 111 lens L111 toward the object side is aspherical. By adopting this configuration, comatic aberration, field curvature, and distortion, which are generated in zoom lenses having extremely wide angles of view exceeding 110 degrees, can be reduced.

In addition, the first lens group G1 is constituted by the 111 lens L111 having a negative refractive power and a concave surface at least toward the image side, and the 112 lens L112 having a negative refractive power and a concave surface at least toward the image side: and the surface of the 112 lens L112 toward the object side is aspherical. By adopting this configuration, comatic aberration, field curvature, and distortion, which are generated in zoom lenses having extremely wide angles of view exceeding 110 degrees, can be reduced.

In addition, the lens L116 most toward the image side within the first lens group G1 is a lens having a positive refractive power and a convex surface toward the object side. By adopting this configuration, comatic aberration, field curvature, and distortion can be reduced.

In addition, the first lens group G1 is constituted by the 11 lens group G11 having a negative refractive power, the 12 lens group G12 having a positive refractive power, and the 13 lens group G13 having a positive refractive power, provided in this order from the object side; and only the 12 lens group G12 moves toward the image side when focusing from an infinite distance to a close distance. By adopting this configuration, variations in the angle of view during focusing operations can be suppressed, which is desired in broadcast cameras, digital cinematic cameras, etc.

In addition, the 11 lens group G11 is constituted by five or more lenses that include three or more lenses having negative refractive powers. By adopting this configuration, comatic aberration, field curvature, and distortion, which are generated in zoom lenses having extremely wide angles of view exceeding 110 degrees, can be reduced.

In addition, the 12 lens group G12 is constituted at least by a lens having a positive refractive power, and a cemented lens formed by a lens having a negative refractive power and a lens having a positive refractive power. By adopting this configuration, variations in field curvature and lateral chromatic aberration during focusing operations car be reduced.

In addition, the 13 lens group G13 is constituted at least by two lenses having positive refractive powers, provided in this order from the object side. By adopting this configuration, spherical aberration can be reduced.

In addition, the second lens group G2 is constituted by the 21 lens group G21 having a negative refractive power, the 22 lens group G22 having a positive refractive power, and the 23 lens group G23 having a negative refractive power. The 21 lens group G21, the 22 lens group G22, and the 23 lens group G23 move to change magnification. By adopting this configuration, comatic aberration and field curvature can be reduced while changing magnification.

Note that with respect to Conditional Formula (1), it is more preferable for Conditional Formula (1-1) below to be satisfied, in order to further reduce variations in aberrations caused by changing magnification. In addition, it is preferable for Conditional Formula (1) to be provided with a lower limit, and it is preferable for the lower limit to be 0.15. By satisfying this lower limit, the lens configuration of the first lens group G1 can be prevented from becoming complex, and miniaturization in the radial direction is facilitated. In this case, it is more preferable for Conditional Formula (1-2) to be satisfied, and even more preferable for Conditional Formula (1-3) to be satisfied.

$$u'/u<0.4 \quad (1\text{-}1)$$

$$0.15<u'/u<0.5 \quad (1\text{-}2)$$

$$0.15<u'/u<0.4 \quad (1\text{-}3)$$

[Example of Application in an Imaging Apparatus]

Figure 26:
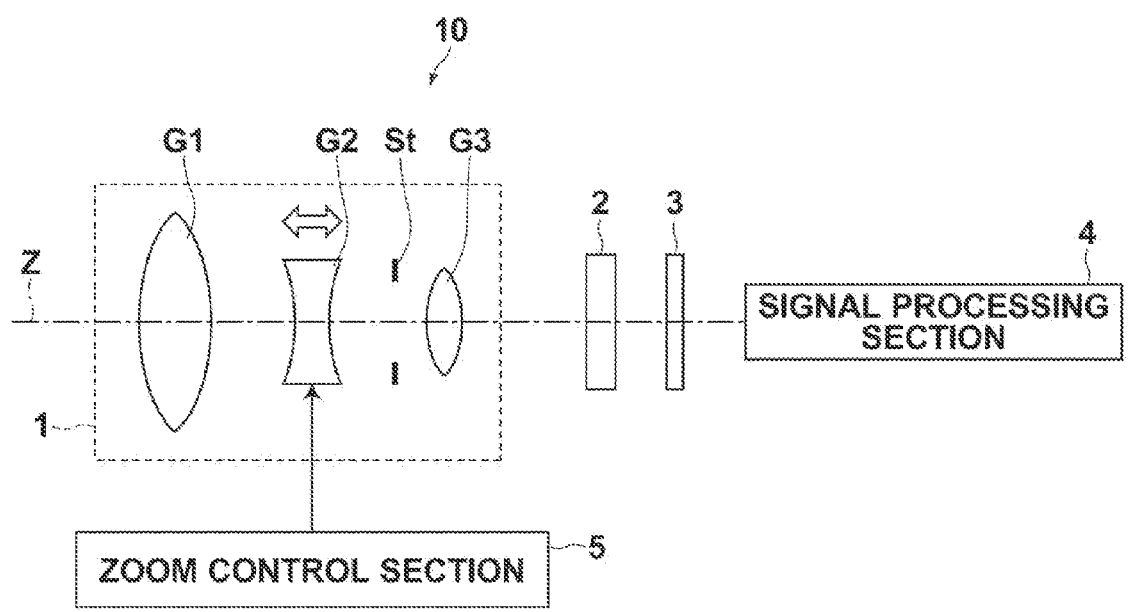
FIG. 26 is a schematic diagram that illustrates the configuration of an imaging apparatus according to an embodiment of the present invention.

Next, an imaging apparatus according to an embodiment of the present invention will be described. FIG. 26 illustrates the schematic configuration of an imaging apparatus that employs a zoom lens of an embodiment of the present invention as an example of an imaging apparatus according to the embodiment of the present invention. Examples of the imaging apparatus include a digital camera, a video camera, a broadcast camera, a cinematic camera, and a surveillance camera that employs an imaging element such as a CCD and a CMOS.

The imaging apparatus 10 illustrated in FIG. 26 is equipped with a zoom lens 1, a filter 2 provided toward the image side of the zoom lens 1, an imaging element 3 that obtains images of subjects which are imaged by the zoom lens 1, a signal processing section 4 that administer calculation processes onto output signals from the imaging element 3, and a zoom control section 5 that changes the magnification of the zoom lens 1 and performs focus adjustments accompanying changes in magnification.

The zoom lens 1 has a first lens group G1 having a positive refractive power which is fixed while changing magnification, a second lens group G2 constituted by two or more magnification changing groups, an aperture stop St, and a third lens group G3 having a positive refractive power which is fixed while changing magnification. The lens groups are schematically illustrated in FIG. 26. The imaging element 3 converts optical images formed by the zoom lens 1 into electrical signals, and the imaging surface thereof is provided to match the position of the image formation plane of the zoom lens 1. A CCD, a CMOS, or the like may be employed as the imaging element 3.

High resolution image signals can be obtained by employing the zoom lens of the present embodiment as the zoom lens 1 of the imaging apparatus.

EXAMPLES

Next, the zoom lens of the present invention will be described mainly with respect to specific examples of numerical values thereof.

Example 1

The arrangements of lens groups of a zoom lens of Example 1 are illustrated in FIG. 1. Note that a detailed description of the lens groups and each lens in the configuration of FIG. 1 has been described above. Therefore, redundant descriptions will be omitted unless particularly necessary.

Table 1, Table 2, and Table 3 below show specific lens data corresponding to the configuration of the zoom lens illustrated in A and B of FIG. 1. Particularly, Table 1 shows basic lens data of the zoom lens, Table 2 shows other data, and Table 3 shows data related to aspherical surfaces. In the lens data of Table 1, ith lens surface numbers that sequentially increase from the object side to the image side, with the surface of the constituent element at the most object side designated as first (i=1~51), are shown in the surface number column Si for the zoom lens of Example 1. Note that here, the optical member GC is also shown. The radii of curvature (mm) of ith surfaces from the object side are shown in the radius of curvature column Ri. Similarly, the distances (mm) between an ith surface Si and an i+1st surface Si+1 from the object side along the optical axis are shown in the distance column Di. The refractive indices of jth lenses (j=1, 2, 3, . . . ) from the object side with respect to the d line (wavelength: 587.6 nm) are shown in the column Ndj, wherein j sequentially increases with the lens most toward the object side designated as first. The Abbe's numbers of the jth optical elements with respect to the d line are shown in the column vdj. In addition, the aperture stop St is also shown in the basic lens data, and "∞" is indicated in the radius of curvature column corresponding to the aperture stop St.

Table 2 shows the values of the zoom magnification rates of the entire system, the paraxial focal lengths f' (mm), the back focus Bf', F values (F No.), and the angles of view (2ω) in a state in which the zoom lens is focused on infinity at the wide angle end and at the telephoto end, respectively, as the other data.

In the zoom lens of Example 1, the distance D22 between the first lens group G1 and the 21 lens group G21, the distance D26 between the 21 lens group G21 and the 22 lens group G22, the distance D28 between the 22 lens group G22 and the 23 lens group G23, and the distance D31 between the 23 lens group G23 and the third lens group G3 change accompanying changes in magnification. Therefore, these distances D22, D26, D28, and D31 are variable. In addition, when focus is changed from an object at infinity to an object at a limited distance, the 12 lens group G12 moves along the optical axis to perform focusing operations. Therefore, the distance D11 between the 11 lens group G11 and the 12 lens group G12 and the distance D18 between the 12 lens group G12 and the 13 lens group G13 are variable. Table 2 shows zoom distances (mm) when focused on infinity at the wide angle end and at the telephoto end as data of the distances D11, D18, D22, D26, D28, and D31 during changes in magnification. Note that the distances D11 and D18 do not change while changing magnification.

In the lens data of Table 1, the symbol "*" toward the left of surface numbers indicate that the lens surfaces corresponding to the surface numbers are aspherical. In the basic lens data of Table 1, the radii of curvature of paraxial regions are shown as the radii of curvature of the aspherical surfaces.

Table 3 shows aspherical surface data of the zoom lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

In addition, Table 3 shows aspherical surface data of the zoom lens of Example 1. Here, the surface numbers of the aspherical surfaces and aspherical surface coefficients related to the aspherical surfaces are shown. In the numerical values of the aspherical surface coefficients, "E-n" (n is an integer) means "$\cdot 10^{-n}$". Note that the aspherical coefficients are the values of coefficients KA and Am in the aspherical surface shape formula below.

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (mm), h is the height (the distance from the optical axis to the surface of the lens, C is the inverse of the paraxial radius of curvature, and KA and Am are aspherical surface coefficients. With respect to the aspherical surface coefficients Am, orders from A3 through A20 are effectively employed to represent the aspherical surfaces of the zoom lens of Example 1, based on the above aspherical surface formula.

The manners in which data are shown in Table 1 through Table 3 as described above are common to Tables 4 through 24 to be described later.

In all of the tables below, mm are used as the units for lengths and degrees (°) are used as the units for angles. However, it is possible for optical systems to be proportionately enlarged or proportionately reduced and utilized. Therefore, other appropriate units may be used.

TABLE 1

Example 1: Lens Data

| Si | Ri | Di | ndj | vdj |
|---|---|---|---|---|
| *1 | −5602.7274 | 5.000 | 1.77601 | 50.40 |
| 2 | 40.4848 | 16.205 | | |
| *3 | 67.2691 | 3.000 | 1.77600 | 50.40 |
| 4 | 34.5909 | 19.904 | | |
| 5 | −76.7892 | 1.200 | 1.86165 | 33.60 |
| 6 | 70.5763 | 5.115 | 1.84661 | 23.78 |
| 7 | 167.1611 | 2.222 | | |
| 8 | 822.9730 | 10.153 | 1.58795 | 66.47 |
| 9 | 176.2727 | 0.150 | | |
| 10 | 148.3890 | 14.049 | 1.83649 | 44.35 |
| 11 | −76.0777 | 1.000 | | |
| 12 | 263.4512 | 14.276 | 1.52000 | 51.25 |
| 13 | −59.8683 | 0.150 | | |
| 14 | −59.3451 | 1.200 | 1.88000 | 33.75 |
| 15 | −172.9761 | 0.150 | | |
| 16 | 128.7144 | 2.141 | 1.88300 | 40.76 |
| 17 | 60.0184 | 12.809 | 1.53185 | 63.50 |
| 18 | −803.1206 | 8.330 | | |
| 19 | −803.1625 | 10.856 | 1.43875 | 94.93 |
| 20 | −63.8762 | 0.150 | | |
| 21 | 203.7122 | 6.289 | 1.43875 | 94.93 |
| 22 | −208.6602 | DD [22] | | |
| *23 | 52.6051 | 1.200 | 1.45559 | 86.83 |
| 24 | 26.2262 | 8.148 | | |
| 25 | −137.3792 | 1.200 | 1.71266 | 51.20 |
| 26 | 48.3461 | DD [26] | | |
| 27 | 89.9601 | 3.182 | 1.88000 | 38.30 |
| 28 | −403.7189 | DD [28] | | |
| 29 | −41.6774 | 1.200 | 1.60849 | 56.10 |
| 30 | 69.7333 | 3.629 | 1.88000 | 39.53 |
| 31 | −123.1276 | DD [31] | | |
| 32 (aperture stop) | ∞ | 0.150 | | |
| 33 | 170.3581 | 2.548 | 1.43500 | 90.00 |
| 34 | −119.2921 | 0.150 | | |
| 35 | 87.7077 | 2.051 | 1.72679 | 28.66 |
| 36 | 315.3829 | 14.270 | | |
| 37 | 124.4745 | 5.781 | 1.56453 | 70.07 |
| 38 | −27.2970 | 1.200 | 1.76492 | 51.51 |
| 39 | −270.7130 | 13.585 | | |
| 40 | 68.7960 | 5.250 | 1.58441 | 59.67 |
| 41 | −41.1022 | 0.150 | | |
| 42 | 42.0689 | 6.860 | 1.68243 | 57.38 |
| 43 | −24.5520 | 1.200 | 1.88000 | 40.00 |
| 44 | 22.4208 | 1.660 | | |
| 45 | 42.0909 | 7.883 | 1.48265 | 71.47 |
| 46 | −16.2387 | 1.200 | 1.87999 | 40.00 |
| 47 | 1448.9000 | 2.456 | | |
| 48 | 167.9587 | 8.610 | 1.49815 | 80.28 |
| 49 | −21.6331 | 0.000 | | |
| 50 | ∞ | 3.700 | 1.51633 | 64.14 |
| 51 | ∞ | 29.510 | | |

TABLE 2

Example 1: Other Data

| | Wide Angle End | Telephoto End |
|---|---|---|
| Zoom Ratio | 1.0 | 2.1 |
| f' | 10.35 | 22.04 |
| Bf' | 31.95 | 31.95 |
| F No. | 2.66 | 2.66 |
| 2ω (°) | 116.0 | 69.8 |
| DD [11] | 1.00 | 1.00 |
| DD [18] | 8.33 | 8.33 |
| DD [22] | 1.50 | 49.01 |
| DD [26] | 11.85 | 10.18 |
| DD [28] | 31.13 | 7.15 |
| DD [31] | 23.41 | 1.56 |

TABLE 3

Example 1: Aspherical Surface Data

| | Surface Number | | |
|---|---|---|---|
| | 1 | 3 | 23 |
| KA | 1.0000000E+00 | 1.0000000E+00 | 1.0000000E+00 |
| A3 | 0.0000000E+00 | 0.0000000E+00 | 0.0000000E+00 |
| A4 | 4.2557094E−06 | −3.8138334E−06 | 2.1966624E−06 |
| A5 | 0.0000000E+00 | 0.0000000E+00 | 0.0000000E+00 |
| A6 | −2.0937132E−09 | −1.4330918E−09 | 1.8606952E−09 |
| A7 | 0.0000000E+00 | 0.0000000E+00 | 0.0000000E+00 |
| A8 | 9.6447110E−13 | 2.8045407E−12 | −4.0575053E−12 |
| A9 | 0.0000000E+00 | 0.0000000E+00 | 0.0000000E+00 |
| A10 | −2.5448289E−16 | −1.4784549E−15 | 1.0574082E−14 |
| A11 | 0.0000000E+00 | 0.0000000E+00 | 0.0000000E+00 |
| A12 | 3.2618475E−20 | 2.9142297E−19 | −7.8732439E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 2

A and B of FIG. 2 are diagrams that illustrate the configuration of a zoom lens of Example 2 of the present invention. The zoom lens of Example 2 has substantially the same configuration as the zoom lens of Example 1, but differs in that a 111 lens L111 of a 11 lens group G11 has a negative meniscus shape with a convex surface toward the object side. Table 4 shows basic lens data of the zoom lens of Example 2, Table 5 shows other data of the zoom lens of Example 2, and Table 6 shows aspherical surface data of the zoom lens of Example 2.

TABLE 4

Example 2: Lens Data

| Si | Ri | Di | ndj | vdj |
|---|---|---|---|---|
| *1 | 470.9983 | 4.000 | 1.80000 | 48.00 |
| 2 | 41.0589 | 16.094 | | |
| *3 | 62.9792 | 3.000 | 1.77600 | 50.40 |
| 4 | 31.0924 | 20.179 | | |
| 5 | −73.6227 | 1.252 | 1.84458 | 36.04 |
| 6 | 82.0299 | 4.685 | 1.88000 | 21.00 |
| 7 | 143.1938 | 2.274 | | |
| 8 | 763.0652 | 11.508 | 1.71089 | 55.96 |
| 9 | 140.4752 | 0.798 | | |
| 10 | 132.9438 | 13.678 | 1.84275 | 43.73 |
| 11 | −72.7950 | 1.000 | | |
| 12 | 253.8910 | 13.179 | 1.43500 | 67.21 |
| 13 | −53.1753 | 0.150 | | |
| 14 | −52.8532 | 1.200 | 1.88000 | 32.17 |
| 15 | −116.7888 | 0.150 | | |
| 16 | 118.3431 | 6.071 | 1.88000 | 40.00 |
| 17 | 56.2979 | 11.362 | 1.53101 | 52.25 |
| 18 | −648.8113 | 9.610 | | |
| 19 | −171.1832 | 7.742 | 1.44404 | 88.61 |
| 20 | −57.1931 | 0.150 | | |
| 21 | 210.5396 | 6.067 | 1.46646 | 85.16 |
| 22 | −150.0970 | DD [22] | | |
| *23 | 54.3153 | 1.200 | 1.59383 | 65.57 |
| 24 | 28.1405 | 5.854 | | |
| 25 | −207.0111 | 1.200 | 1.75207 | 52.79 |
| 26 | 48.3708 | DD [26] | | |
| 27 | 83.8563 | 2.824 | 1.88000 | 38.77 |
| 28 | −562.6506 | DD [28] | | |
| 29 | −40.7044 | 1.200 | 1.54852 | 62.82 |
| 30 | 72.9617 | 3.402 | 1.88000 | 40.00 |
| 31 | −158.1955 | DD [31] | | |
| 32 (aperture stop) | ∞ | 0.150 | | |
| 33 | 239.6311 | 2.535 | 1.48512 | 82.29 |
| 34 | −129.7054 | 0.401 | | |
| 35 | 97.7861 | 2.060 | 1.72230 | 28.89 |
| 36 | 407.6609 | 16.026 | | |
| 37 | 111.6274 | 4.896 | 1.50065 | 79.90 |
| 38 | −28.9338 | 1.200 | 1.66944 | 48.47 |
| 39 | −148.9545 | 17.316 | | |
| 40 | 55.8637 | 4.799 | 1.57443 | 68.55 |
| 41 | −43.2330 | 0.150 | | |
| 42 | 44.2412 | 6.159 | 1.59816 | 64.85 |
| 43 | −24.1805 | 1.200 | 1.88000 | 40.00 |
| 44 | 22.8790 | 1.526 | | |
| 45 | 43.0650 | 7.480 | 1.48644 | 57.54 |
| 46 | −16.2750 | 1.200 | 1.88000 | 40.00 |
| 47 | 655.6435 | 2.710 | | |
| 48 | 177.0823 | 8.628 | 1.56751 | 69.61 |
| 49 | −22.1327 | 0.000 | | |
| 50 | ∞ | 3.700 | 1.51633 | 64.14 |
| 51 | ∞ | 29.510 | | |

TABLE 5

Example 2: Other Data

| | Wide Angle End | Telephoto End |
|---|---|---|
| Zoom Ratio | 1.0 | 2.1 |
| f | 10.35 | 22.04 |
| Bf | 31.95 | 31.95 |
| F No. | 2.66 | 2.66 |
| 2ω (°) | 115.8 | 69.8 |
| DD [11] | 1.00 | 1.00 |
| DD [18] | 9.61 | 9.61 |
| DD [22] | 1.50 | 48.62 |
| DD [26] | 12.41 | 10.43 |
| DD [28] | 29.51 | 4.92 |
| DD [31] | 22.12 | 1.57 |

TABLE 6

Example 2: Aspherical Surface Data

| | Surface Number | | |
|---|---|---|---|
| | 1 | 3 | 23 |
| KA | 1.0000000E+00 | 1.0000000E+00 | 1.0000000E+00 |
| A3 | 0.0000000E+00 | 0.0000000E+00 | 0.0000000E+00 |
| A4 | 4.2962670E−06 | −4.0589178E−06 | 1.4059522E−06 |
| A5 | 0.0000000E+00 | 0.0000000E+00 | 0.0000000E+00 |
| A6 | −2.2219080E−09 | −4.4212017E−10 | 1.6091609E−09 |
| A7 | 0.0000000E+00 | 0.0000000E+00 | 0.0000000E+00 |
| A8 | 1.1780648E−12 | 1.9297163E−12 | −4.6706923E−12 |
| A9 | 0.0000000E+00 | 0.0000000E+00 | 0.0000000E+00 |
| A10 | −3.4984459E−16 | −1.0397768E−15 | 1.0485605E−14 |
| A11 | 0.0000000E+00 | 0.0000000E+00 | 0.0000000E+00 |
| A12 | 5.2002804E−20 | 1.9212938E−19 | −7.9038595E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 3

A and B of FIG. 3 are diagrams that illustrate the configuration of a zoom lens of Example 3 of the present invention. The zoom lens of Example 3 has substantially the same configuration as the zoom lens of Example 1, but differs in that 12 lens group G12 is constituted by a 121 lens L121 having a negative meniscus shape with a convex surface toward the object side and a biconvex lens L122, provided in this order from the object side, instead of the biconvex lens L121 and the lens L122 having a negative meniscus shape with a convex surface toward the image side.

Table 7 shows basic lens data of the zoom lens of Example 3, Table 8 shows other data of the zoom lens of Example 3, and Table 9 shows aspherical surface data of the zoom lens of Example 3.

TABLE 7

Example 3: Lens Data

| Si | Ri | Di | ndj | νdj |
|---|---|---|---|---|
| *1 | −2374.3052 | 5.437 | 1.77293 | 50.71 |
| 2 | 40.2353 | 17.040 | | |
| *3 | 66.1297 | 3.125 | 1.77601 | 47.74 |
| 4 | 33.8729 | 19.438 | | |
| 5 | −79.0491 | 1.200 | 1.87002 | 36.81 |
| 6 | 71.2540 | 4.711 | 1.84661 | 23.78 |
| 7 | 169.9200 | 1.896 | | |
| 8 | 705.7980 | 8.632 | 1.59522 | 64.68 |
| 9 | 197.7096 | 1.013 | | |
| 10 | 133.6683 | 12.947 | 1.74576 | 53.21 |
| 11 | −80.7878 | 1.000 | | |
| 12 | 165.7051 | 1.269 | 1.84455 | 32.50 |
| 13 | 61.6360 | 0.215 | | |
| 14 | 62.7071 | 14.854 | 1.47546 | 62.49 |
| 15 | −298.4136 | 1.047 | | |
| 16 | 120.6982 | 2.287 | 1.88300 | 40.76 |
| 17 | 63.2924 | 13.688 | 1.59067 | 56.02 |
| 18 | −1194.0623 | 9.800 | | |
| 19 | −924.0384 | 11.824 | 1.43875 | 94.93 |
| 20 | −65.3246 | 0.277 | | |
| 21 | 197.9700 | 5.786 | 1.43875 | 94.93 |
| 22 | −219.4695 | DD [22] | | |
| *23 | 51.4164 | 1.200 | 1.43500 | 90.00 |
| 24 | 26.4867 | 7.089 | | |
| 25 | −134.0658 | 1.200 | 1.73626 | 50.76 |
| 26 | 48.6287 | DD [26] | | |
| 27 | 87.4019 | 2.954 | 1.86811 | 37.93 |
| 28 | −400.6474 | DD [28] | | |
| 29 | −41.2864 | 1.200 | 1.61675 | 56.04 |
| 30 | 69.6918 | 3.651 | 1.88000 | 38.68 |
| 31 | −125.3908 | DD [31] | | |
| 32 (aperture stop) | ∞ | 0.150 | | |
| 33 | 166.9805 | 2.756 | 1.45684 | 86.42 |
| 34 | −118.6083 | 0.206 | | |
| 35 | 86.2647 | 2.389 | 1.73914 | 28.27 |
| 36 | 329.6015 | 13.751 | | |
| 37 | 123.7452 | 6.548 | 1.57517 | 67.06 |
| 38 | −27.3218 | 1.449 | 1.76440 | 51.56 |
| 39 | −266.5849 | 13.277 | | |
| 40 | 68.6267 | 5.863 | 1.56463 | 63.16 |
| 41 | −40.9213 | 0.571 | | |
| 42 | 42.3044 | 6.627 | 1.66130 | 58.44 |
| 43 | −24.5471 | 1.201 | 1.87987 | 38.69 |
| 44 | 22.4397 | 1.780 | | |
| 45 | 42.1186 | 8.130 | 1.48214 | 71.53 |
| 46 | −16.2717 | 1.200 | 1.87996 | 38.46 |
| 47 | 1404.9570 | 2.273 | | |
| 48 | 167.3605 | 8.440 | 1.50962 | 78.52 |
| 49 | −21.5947 | 0.000 | | |
| 50 | ∞ | 3.700 | 1.51633 | 64.14 |
| 51 | ∞ | 29.500 | | |

TABLE 8

Example 3: Other Data

| | Wide Angle End | Telephoto End |
|---|---|---|
| Zoom Ratio | 1.0 | 2.1 |
| f' | 10.35 | 22.04 |
| Bf' | 31.94 | 31.94 |
| F No. | 2.66 | 2.67 |
| 2ω (°) | 115.6 | 69.8 |
| DD [11] | 1.00 | 1.00 |
| DD [18] | 9.80 | 9.80 |
| DD [22] | 1.52 | 48.58 |
| DD [26] | 10.31 | 9.29 |
| DD [28] | 29.94 | 4.97 |
| DD [31] | 22.61 | 1.53 |

TABLE 9

Example 3: Aspherical Surface Data

| | Surface Number | | |
|---|---|---|---|
| | 1 | 3 | 23 |
| KA | 1.0000000E+00 | 1.0000000E+00 | 1.0000000E+00 |
| A3 | 0.0000000E+00 | 0.0000000E+00 | 0.0000000E+00 |
| A4 | 4.1901480E−06 | −3.9693863E−06 | 1.9894944E−06 |
| A5 | 0.0000000E+00 | 0.0000000E+00 | 0.0000000E+00 |
| A6 | −2.0607073E−09 | −1.4183614E−09 | 1.7445006E−09 |
| A7 | 0.0000000E+00 | 0.0000000E+00 | 0.0000000E+00 |
| A8 | 9.5545699E−13 | 2.8040654E−12 | −4.0684101E−12 |
| A9 | 0.0000000E+00 | 0.0000000E+00 | 0.0000000E+00 |
| A10 | −2.5439388E−16 | −1.4752943E−15 | 1.0573339E−14 |
| A11 | 0.0000000E+00 | 0.0000000E+00 | 0.0000000E+00 |
| A12 | 3.2502671E−20 | 2.9401489E−19 | −7.8732199E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 4

A and B of FIG. 4 are diagrams that illustrate the configuration of a zoom lens of Example 4 of the present invention. The zoom lens of Example 4 has substantially the same configuration as the zoom lens of Example 1, but differs in that a 11 lens group G11 is constituted by a 111 lens L111 having a negative meniscus shape with a convex surface toward the object side, a 112 lens L112 having a negative meniscus shape with a concave surface toward the image side, a biconcave lens L113, a lens L114 having a negative meniscus shape with a convex surface toward the image side, and a biconvex lens L115, provided in this order from the object side. In addition, a 13 lens group G13 is constituted by a biconvex lens L131 and a lens L132 having a positive meniscus shape with a convex surface toward the object side, provided in this order from the object side, instead of the lens L131 having a positive meniscus shape with a convex surface toward the image side and the biconvex lens L132. Further, a 22 lens group G22 is constituted by a lens L221 having a positive meniscus shape with a convex surface toward the object side instead of the biconvex lens L221. Due to these differences, the surface numbers of lenses more toward the image side than the lens L113 are shifted by 1 from those of Example 1. Accordingly, the distances D21, D25, D27, and D30 are those that change accompanying changes in imaging magnification.

Table 10 shows basic lens data of the zoom lens of Example 4, Table 11 shows other data of the zoom lens of Example 4, and Table 12 shows aspherical surface data of the zoom lens of Example 4.

TABLE 10

Example 4: Lens Data

| Si | Ri | Di | ndj | vdj |
|---|---|---|---|---|
| *1 | 474.1079 | 4.074 | 1.88000 | 36.02 |
| 2 | 38.1537 | 15.323 | | |
| *3 | 57.6675 | 3.000 | 1.88000 | 40.00 |
| 4 | 32.3563 | 15.945 | | |
| 5 | −111.1467 | 2.400 | 1.88300 | 40.76 |
| 6 | 101.7368 | 8.002 | | |
| 7 | −77.3379 | 1.200 | 1.43500 | 82.06 |
| 8 | −615.4996 | 6.691 | | |
| 9 | 301.7285 | 9.614 | 1.87999 | 34.48 |
| 10 | −83.3740 | 1.200 | | |
| 11 | 87.3406 | 15.951 | 1.43956 | 87.94 |
| 12 | −86.3341 | 2.983 | | |
| 13 | −69.4525 | 1.799 | 1.88000 | 24.68 |
| 14 | −82.1391 | 1.552 | | |
| 15 | 205.8050 | 6.986 | 1.88001 | 33.30 |
| 16 | 47.9172 | 14.886 | 1.43501 | 86.05 |
| 17 | −188.9332 | DD[17] | | |
| 18 | 275.6761 | 11.052 | 1.56570 | 69.89 |
| 19 | −76.4781 | 0.344 | | |
| 20 | 123.8611 | 2.788 | 1.44152 | 89.00 |
| 21 | 240.6510 | DD[21] | | |
| *22 | 67.8102 | 1.253 | 1.88000 | 40.00 |
| 23 | 31.7225 | 4.241 | | |
| 24 | −484.3459 | 1.200 | 1.68126 | 57.44 |
| 25 | 63.9111 | DD[25] | | |
| 26 | 58.2453 | 2.323 | 1.79506 | 25.25 |
| 27 | 158.3898 | DD[27] | | |
| 28 | −47.7543 | 1.200 | 1.56867 | 65.78 |
| 29 | 64.6989 | 2.929 | 1.88000 | 28.37 |
| 30 | −552.2441 | DD[30] | | |
| 31 (aperture stop) | ∞ | 0.299 | | |
| 32 | 459.5820 | 2.421 | 1.43501 | 89.63 |
| 33 | −127.7905 | 0.297 | | |
| 34 | 90.0800 | 2.811 | 1.74142 | 27.93 |
| 35 | −14886.6570 | 7.817 | | |
| 36 | 95.5653 | 10.193 | 1.55514 | 71.35 |
| 37 | −39.6539 | 1.694 | 1.85632 | 34.30 |
| 38 | −251.4526 | 19.723 | | |
| 39 | 90.7134 | 4.468 | 1.46016 | 62.61 |
| 40 | −50.6603 | 8.208 | | |
| 41 | 44.6260 | 6.151 | 1.63441 | 34.69 |
| 42 | −26.8777 | 1.200 | 1.87980 | 25.58 |
| 43 | 26.3581 | 1.076 | | |
| 44 | 39.0893 | 7.774 | 1.52585 | 50.15 |
| 45 | −21.5664 | 1.200 | 1.87768 | 40.23 |
| 46 | −470.8190 | 3.666 | | |
| 47 | 70.5057 | 8.518 | 1.46393 | 85.55 |
| 48 | −28.0438 | 0.000 | | |
| 49 | ∞ | 3.700 | 1.51633 | 64.14 |
| 50 | ∞ | 29.510 | | |

TABLE 11

Example 4: Other Data

| | Wide Angle End | Telephoto End |
|---|---|---|
| Zoom Ratio | 1.0 | 2.4 |
| f | 15.69 | 37.66 |
| Bf | 48.45 | 48.45 |
| F No. | 2.67 | 2.67 |
| 2ω[°] | 115.8 | 63.4 |
| DD [10] | 1.20 | 1.20 |
| DD [17] | 5.45 | 5.45 |
| DD [21] | 1.50 | 46.28 |
| DD [25] | 7.49 | 6.72 |
| DD [27] | 31.92 | 4.96 |
| DD [30] | 18.57 | 1.52 |

TABLE 12

Example 4: Aspherical Surface Data

| | Surface Number | | |
|---|---|---|---|
| | 1 | 3 | 22 |
| KA | 1.0000000E+00 | 1.0000000E+00 | 1.0000000E+00 |
| A3 | 0.0000000E+00 | 0.0000000E+00 | 0.0000000E+00 |
| A4 | 5.1888250E−06 | −5.1424983E−06 | −5.2553245E−07 |
| A5 | 0.0000000E+00 | 0.0000000E+00 | 0.0000000E+00 |
| A6 | −3.2345093E−09 | 5.1283416E−11 | 8.3430150E−10 |
| A7 | 0.0000000E+00 | 0.0000000E+00 | 0.0000000E+00 |
| A8 | 1.9874033E−12 | 1.1415310E−12 | −4.9317236E−12 |
| A9 | 0.0000000E+00 | 0.0000000E+00 | 0.0000000E+00 |
| A10 | −6.8358443E−16 | −3.4233189E−16 | 1.0673579E−14 |
| A11 | 0.0000000E+00 | 0.0000000E+00 | 0.0000000E+00 |
| A12 | 1.1455216E−19 | −1.1289102E−21 | −7.8901295E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 5

A and B of FIG. 5 are diagrams that illustrate the configuration of a zoom lens of Example 5 of the present invention. The zoom lens of Example 5 has substantially the same configuration as the zoom lens of Example 1, but differs in that a 111 lens L111 of a 11 lens group G11 has a negative meniscus shape with a convex surface toward the object side, and that a biconcave lens L115 is employed instead of the lens L115 having a negative meniscus shape with a convex surface toward the object side. In addition, a lens L124 having a positive meniscus shape with a convex surface toward the object side is employed in a 12 lens group G12 instead of the biconvex lens L124. Further, a lens L221 having a positive meniscus shape with a convex surface toward the object side is employed in a 22 lens group G22 instead of the biconvex lens L221.

Table 13 shows basic lens data of the zoom lens of Example 5, Table 14 shows other data of the zoom lens of Example 5, and Table 15 shows aspherical surface data of the zoom lens of Example 5.

TABLE 13

Example 5: Lens Data

| Si | Ri | Di | ndj | vdj |
|---|---|---|---|---|
| *1 | 267.0650 | 4.000 | 1.88000 | 38.47 |
| 2 | 40.8188 | 16.169 | | |

TABLE 13-continued

Example 5: Lens Data

| Si | Ri | Di | ndj | vdj |
|---|---|---|---|---|
| *3 | 57.1949 | 3.000 | 1.88000 | 40.00 |
| 4 | 30.3582 | 19.373 | | |
| 5 | −73.3039 | 1.200 | 1.83378 | 37.04 |
| 6 | 107.7748 | 2.140 | 1.88000 | 21.00 |
| 7 | 141.2687 | 2.748 | | |
| 8 | −3187.4185 | 11.082 | 1.75906 | 52.09 |
| 9 | 176.7544 | 0.888 | | |
| 10 | 155.9184 | 14.922 | 1.84605 | 43.39 |
| 11 | −68.7936 | 1.000 | | |
| 12 | 252.3969 | 13.649 | 1.43500 | 68.66 |
| 13 | −51.7170 | 0.150 | | |
| 14 | −51.5124 | 1.200 | 1.88000 | 34.49 |
| 15 | −101.3790 | 0.150 | | |
| 16 | 116.5514 | 11.403 | 1.88000 | 39.98 |
| 17 | 57.5152 | 10.196 | 1.51176 | 57.92 |
| 18 | 2270.6872 | 7.160 | | |
| 19 | −150.6477 | 7.678 | 1.47234 | 84.25 |
| 20 | −55.8512 | 0.150 | | |
| 21 | 362.9012 | 5.775 | 1.56840 | 69.48 |
| 22 | −133.9193 | DD[22] | | |
| *23 | 58.8701 | 1.200 | 1.74162 | 53.34 |
| 24 | 29.6264 | 5.178 | | |
| 25 | −570.4583 | 1.200 | 1.79321 | 48.68 |
| 26 | 58.3520 | DD[26] | | |
| 27 | 84.6042 | 2.613 | 1.88000 | 31.70 |
| 28 | 51378.9150 | DD[28] | | |
| 29 | −38.5634 | 1.200 | 1.49460 | 77.33 |
| 30 | 65.6509 | 3.437 | 1.88000 | 40.00 |
| 31 | −209.5285 | DD[31] | | |
| 32 (aperture stop) | ∞ | 0.150 | | |
| 33 | 324.6855 | 2.252 | 1.44678 | 86.42 |
| 34 | −154.7983 | 0.150 | | |
| 35 | 97.7394 | 1.986 | 1.78661 | 27.45 |
| 36 | 326.0532 | 17.359 | | |
| 37 | 108.8754 | 4.823 | 1.53785 | 74.18 |
| 38 | −29.3423 | 1.200 | 1.75907 | 41.25 |
| 39 | −112.2575 | 16.473 | | |
| 40 | 55.7763 | 4.783 | 1.60812 | 63.37 |
| 41 | −45.7252 | 0.150 | | |
| 42 | 43.7635 | 6.148 | 1.58727 | 66.57 |
| 43 | −25.0218 | 1.200 | 1.88000 | 40.00 |
| 44 | 23.1268 | 1.454 | | |
| 45 | 41.6929 | 7.270 | 1.49393 | 68.18 |
| 46 | −17.0870 | 1.200 | 1.88000 | 40.00 |
| 47 | 272.4848 | 3.574 | | |
| 48 | 160.7191 | 8.704 | 1.54105 | 73.69 |
| 49 | −22.4676 | 0.000 | | |
| 50 | ∞ | 3.700 | 1.51633 | 64.14 |
| 51 | ∞ | 29.500 | | |

TABLE 14

Example 5: Other Data

| | Wide Angle End | Telephoto End |
|---|---|---|
| Zoom Ratio | 1.0 | 2.2 |
| f | 10.35 | 22.76 |
| Bf | 31.94 | 31.94 |
| F No. | 2.66 | 2.66 |
| 2ω (°) | 115.8 | 68.0 |
| DD[11] | 1.00 | 1.00 |
| DD[18] | 7.16 | 7.16 |
| DD[22] | 1.50 | 49.17 |
| DD[26] | 14.70 | 9.84 |
| DD[28] | 28.28 | 5.45 |
| DD[31] | 21.59 | 1.60 |

TABLE 15

Example 5: Aspherical Surface Data

| | Surface Number | | |
|---|---|---|---|
| | 1 | 3 | 23 |
| KA | 1.0000000E+00 | 1.0000000E+00 | 1.0000000E+00 |
| A3 | 0.0000000E+00 | 0.0000000E+00 | 0.0000000E+00 |
| A4 | 4.3613497E−06 | −4.4810772E−06 | 7.3113775E−07 |
| A5 | 0.0000000E+00 | 0.0000000E+00 | 0.0000000E+00 |
| A6 | −2.3873850E−09 | −2.3563937E−10 | 1.2963986E−09 |
| A7 | 0.0000000E+00 | 0.0000000E+00 | 0.0000000E+00 |
| A8 | 1.4025775E−12 | 1.6772162E−12 | −4.9580412E−12 |
| A9 | 0.0000000E+00 | 0.0000000E+00 | 0.0000000E+00 |
| A10 | −4.5541124E−16 | −8.1799892E−16 | 1.0519931E−14 |
| A11 | 0.0000000E+00 | 0.0000000E+00 | 0.0000000E+00 |
| A12 | 7.4972779E−20 | 1.2091634E−19 | −7.9086052E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 6

A and B of FIG. 6 are diagrams that illustrate the configuration of a zoom lens of Example 6 of the present invention. The zoom lens of Example 6 has substantially the same configuration as the zoom lens of Example 1. Table 16 shows basic lens data of the zoom lens of Example 6, Table 17 shows other data of the zoom lens of Example 6, and Table 18 shows aspherical surface data of the zoom lens of Example 6.

TABLE 16

Example 6: Lens Data

| Si | Ri | Di | ndj | vdj |
|---|---|---|---|---|
| *1 | −2881.7127 | 5.000 | 1.77601 | 50.40 |
| 2 | 41.0154 | 16.391 | | |
| *3 | 68.8839 | 3.000 | 1.77600 | 50.40 |
| 4 | 35.8341 | 19.853 | | |
| 5 | −80.6569 | 1.200 | 1.88000 | 30.24 |
| 6 | 72.0998 | 5.128 | 1.84661 | 23.78 |
| 7 | 168.6367 | 2.447 | | |
| 8 | 1186.4435 | 10.428 | 1.55445 | 71.62 |
| 9 | 178.8809 | 0.150 | | |
| 10 | 152.2708 | 13.970 | 1.86323 | 41.68 |
| 11 | −80.3257 | 1.000 | | |
| 12 | 223.7125 | 14.714 | 1.52000 | 51.25 |
| 13 | −62.7251 | 0.150 | | |
| 14 | −62.1694 | 1.200 | 1.88000 | 36.80 |
| 15 | −185.0767 | 0.150 | | |
| 16 | 125.9052 | 2.523 | 1.88300 | 40.76 |
| 17 | 59.5392 | 12.575 | 1.53164 | 75.13 |
| 18 | −2260.3404 | 8.640 | | |
| 19 | −2260.3759 | 10.977 | 1.43875 | 94.93 |
| 20 | −66.2660 | 0.150 | | |
| 21 | 203.9415 | 6.158 | 1.43875 | 94.93 |
| 22 | −217.5835 | DD[22] | | |
| *23 | 52.9652 | 1.200 | 1.43500 | 90.00 |
| 24 | 25.7985 | 8.426 | | |
| 25 | −118.9549 | 1.200 | 1.69022 | 55.66 |
| 26 | 48.6755 | DD[26] | | |
| 27 | 90.4950 | 3.021 | 1.88000 | 40.00 |
| 28 | −393.6471 | DD[28] | | |
| 29 | −41.7319 | 1.200 | 1.61114 | 55.57 |
| 30 | 70.0636 | 3.563 | 1.88000 | 40.00 |

TABLE 16-continued

Example 6: Lens Data

| Si | Ri | Di | ndj | vdj |
|---|---|---|---|---|
| 31 | −122.8635 | DD [31] | | |
| 32 (aperture stop) | ∞ | 0.150 | | |
| 33 | 165.9248 | 2.509 | 1.44534 | 88.41 |
| 34 | −119.6631 | 0.150 | | |
| 35 | 85.4515 | 1.971 | 1.76411 | 26.99 |
| 36 | 281.7325 | 13.377 | | |
| 37 | 127.0634 | 5.501 | 1.57519 | 68.43 |
| 38 | −27.1609 | 1.200 | 1.78096 | 49.90 |
| 39 | −300.2986 | 13.177 | | |
| 40 | 75.8350 | 4.978 | 1.61179 | 55.42 |
| 41 | −40.9206 | 0.150 | | |
| 42 | 40.1849 | 6.762 | 1.67389 | 57.81 |
| 43 | −24.5058 | 1.200 | 1.88000 | 40.00 |
| 44 | 22.1725 | 1.615 | | |
| 45 | 41.1846 | 7.718 | 1.47495 | 83.85 |
| 46 | −16.2486 | 1.200 | 1.88000 | 40.00 |
| 47 | 579.2450 | 2.262 | | |
| 48 | 150.9116 | 8.600 | 1.51056 | 78.38 |
| 49 | −21.4092 | 0.000 | | |
| 50 | ∞ | 3.700 | 1.51633 | 64.14 |
| 51 | ∞ | 29.500 | | |

TABLE 17

Example 6: Other Data

| | Wide Angle End | Telephoto End |
|---|---|---|
| Zoom Ratio | 1.0 | 2.1 |
| f | 10.35 | 22.04 |
| Bf | 31.94 | 31.94 |
| F No. | 2.66 | 2.66 |
| 2ω (°) | 116.0 | 69.8 |
| DD [11] | 1.00 | 1.00 |
| DD [18] | 8.64 | 8.64 |
| DD [22] | 1.50 | 48.92 |
| DD [26] | 12.05 | 10.27 |
| DD [28] | 30.38 | 6.12 |
| DD [31] | 22.95 | 1.56 |

TABLE 18

Example 6: Aspherical Surface Data

| | Surface Number | | |
|---|---|---|---|
| | 1 | 3 | 23 |
| KA | 1.0000000E+00 | 1.0000000E+00 | 1.0000000E+00 |
| A3 | 0.0000000E+00 | 0.0000000E+00 | 0.0000000E+00 |
| A4 | 4.1157919E−06 | −3.5540553E−06 | 2.3229255E−06 |
| A5 | 0.0000000E+00 | 0.0000000E+00 | 0.0000000E+00 |
| A6 | −1.9610931E−09 | −1.5381148E−09 | 1.8862781E−09 |
| A7 | 0.0000000E+00 | 0.0000000E+00 | 0.0000000E+00 |
| A8 | 8.6245912E−13 | 2.9656692E−12 | −4.0159330E−12 |
| A9 | 0.0000000E+00 | 0.0000000E+00 | 0.0000000E+00 |
| A10 | −2.1826605E−16 | −1.6143406E−15 | 1.0606349E−14 |
| A11 | 0.0000000E+00 | 0.0000000E+00 | 0.0000000E+00 |
| A12 | 2.6613495E−20 | 3.2435081E−19 | −7.8546330E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 7

A and B of FIG. 7 are diagrams that illustrate the configuration of a zoom lens of Example 7 of the present invention. The zoom lens of Example 7 has substantially the same configuration as the zoom lens of Example 1, but differs in that a 11 lens group G11 is constituted by a 111 lens L111 having a negative refractive power and a concave surface at least toward the image side, a 112 lens L112 having a negative refractive power and a concave surface at least toward the image side, a cemented lens formed by a biconcave lens L113 and a lens L114 having a positive meniscus shape with a convex surface toward the object side, and a biconvex lens L115, provided in this order from the object side. In addition, a 12 lens group G12 is constituted by a biconvex lens L121 and a cemented lens formed by a lens L122 having a negative meniscus shape with a convex surface toward the object side and a lens L123 having a positive meniscus shape with a convex surface toward the object side, provided in this order from the object side. Further, a 13 lens group G13 is constituted by two biconvex lenses L131 and L132, provided in this order from the object side. Due to these differences, the surface numbers of lenses more toward the image side than the lens L115 are shifted by 2 from those of Example 1. Accordingly, the distances D18, D22, D24, and D27 are those that change accompanying changes in imaging magnification.

Table 19 shows basic lens data of the zoom lens of Example 7, Table 20 shows other data of the zoom lens of Example 7, and Table 21 shows aspherical surface data of the zoom lens of Example 7.

TABLE 19

Example 7: Lens Data

| Si | Ri | Di | ndj | vdj |
|---|---|---|---|---|
| *1 | −918.6384 | 5.753 | 1.77598 | 50.40 |
| 2 | 40.4747 | 18.367 | | |
| *3 | 69.2592 | 3.000 | 1.77598 | 45.18 |
| 4 | 34.6913 | 17.834 | | |
| 5 | −86.6685 | 1.200 | 1.81917 | 40.98 |
| 6 | 75.3177 | 4.258 | 1.84661 | 23.78 |
| 7 | 151.8277 | 9.348 | | |
| 8 | 158.8519 | 10.995 | 1.55578 | 71.42 |
| 9 | −88.9918 | 1.000 | | |
| 10 | 427.1860 | 13.605 | 1.51999 | 76.92 |
| 11 | −115.4242 | 4.088 | | |
| 12 | 175.7585 | 2.817 | 1.88300 | 40.76 |
| 13 | 55.1736 | 14.356 | 1.55171 | 72.04 |
| 14 | 1072.7878 | 9.750 | | |
| 15 | 778.1012 | 12.155 | 1.43875 | 94.93 |
| 16 | −65.0857 | 0.697 | | |
| 17 | 157.6713 | 6.951 | 1.43875 | 94.93 |
| 18 | −255.0156 | DD [18] | | |
| *19 | 50.2653 | 1.777 | 1.43500 | 90.00 |
| 20 | 26.6740 | 7.165 | | |
| 21 | −107.8910 | 1.200 | 1.72798 | 50.09 |
| 22 | 49.5968 | DD [22] | | |
| 23 | 83.3361 | 3.089 | 1.87006 | 33.88 |
| 24 | −373.3859 | DD [24] | | |
| 25 | −41.8771 | 1.200 | 1.60355 | 54.25 |
| 26 | 69.3464 | 3.668 | 1.87912 | 40.09 |
| 27 | −129.1343 | DD [27] | | |
| 28 (aperture stop) | ∞ | 0.375 | | |
| 29 | 163.2363 | 2.926 | 1.45560 | 86.83 |
| 30 | −120.3620 | 0.493 | | |
| 31 | 83.6336 | 2.397 | 1.78153 | 28.90 |
| 32 | 284.1255 | 13.587 | | |
| 33 | 128.1813 | 6.538 | 1.56576 | 69.84 |
| 34 | −27.1261 | 1.257 | 1.78629 | 49.35 |
| 35 | −300.8706 | 13.379 | | |

TABLE 19-continued

Example 7: Lens Data

| Si | Ri | Di | ndj | vdj |
|---|---|---|---|---|
| 36 | 76.3254 | 5.200 | 1.59769 | 45.81 |
| 37 | −40.7296 | 0.412 | | |
| 38 | 40.2437 | 6.855 | 1.68237 | 57.38 |
| 39 | −24.7054 | 1.200 | 1.87828 | 35.88 |
| 40 | 22.0633 | 1.776 | | |
| 41 | 41.2058 | 7.824 | 1.46493 | 73.55 |
| 42 | −16.2616 | 1.200 | 1.87999 | 40.00 |
| 43 | 593.4960 | 1.796 | | |
| 44 | 143.4591 | 8.528 | 1.50781 | 78.80 |
| 45 | −21.2460 | 0.000 | | |
| 46 | ∞ | 3.700 | 1.51633 | 64.14 |
| 47 | ∞ | 29.500 | | |

TABLE 20

Example 7: Other Data

| | Wide Angle End | Telephoto End |
|---|---|---|
| Zoom Ratio | 1.0 | 2.1 |
| f | 10.35 | 22.04 |
| Bf | 31.94 | 31.94 |
| F No. | 2.66 | 2.66 |
| 2ω (°) | 115.8 | 69.6 |
| DD [9] | 1.00 | 1.00 |
| DD [14] | 9.75 | 9.75 |
| DD [18] | 1.79 | 49.61 |
| DD [22] | 9.27 | 7.65 |
| DD [24] | 29.85 | 4.98 |
| DD [27] | 22.86 | 1.53 |

TABLE 21

Example 7: Aspherical Surface Data

| | Surface Number | | |
|---|---|---|---|
| | 1 | 3 | 19 |
| KA | 1.0000000E+00 | 1.0000000E+00 | 1.0000000E+00 |
| A3 | 0.0000000E+00 | 0.0000000E+00 | 0.0000000E+00 |
| A4 | 4.0922396E−06 | −4.0627394E−06 | 1.9524978E−06 |
| A5 | 0.0000000E+00 | 0.0000000E+00 | 0.0000000E+00 |
| A6 | −1.9855047E−09 | −1.5400039E−09 | 1.8858646E−09 |
| A7 | 0.0000000E+00 | 0.0000000E+00 | 0.0000000E+00 |
| A8 | 8.6950674E−13 | 2.9895140E−12 | −4.0300064E−12 |
| A9 | 0.0000000E+00 | 0.0000000E+00 | 0.0000000E+00 |
| A10 | −2.1835089E−16 | −1.5993574E−15 | 1.0604814E−14 |
| A11 | 0.0000000E+00 | 0.0000000E+00 | 0.0000000E+00 |
| A12 | 2.6127323E−20 | 3.3588147E−19 | −7.8554319E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Example 8

A and B of FIG. 8 are diagrams that illustrate the configuration of a zoom lens of Example 8 of the present invention. The zoom lens of Example 8 has substantially the same configuration as the zoom lens of Example 1, but differs in that a 11 lens group G11 is constituted by a 111 lens L111 having a negative refractive power and a concave surface at least toward the image side, a 112 lens L112 having a negative refractive power and a concave surface at least toward the image side, a cemented lens formed by a biconcave lens L113 and a lens L114 having a positive meniscus shape with a convex surface toward the object side, and a biconvex lens L115, provided in this order from the object side. In addition, a biconvex L121 and a lens L122 having a negative meniscus shape with a convex surface toward the image side are cemented together in a 12 lens group G12. Due to these differences, the surface numbers of lenses more toward the image side than the lens L122 are shifted by 3 from those of Example 1. Accordingly, the distances D19, D23, D25, and D28 are those that change accompanying changes in imaging magnification.

Table 22 shows basic lens data of the zoom lens of Example 8, Table 23 shows other data of the zoom lens of Example 8, and Table 24 shows aspherical surface data of the zoom lens of Example 8.

TABLE 22

Example 8: Lens Data

| Si | Ri | Di | ndj | vdj |
|---|---|---|---|---|
| *1 | −1079.7109 | 5.016 | 1.77600 | 50.40 |
| 2 | 40.6379 | 16.812 | | |
| *3 | 70.6003 | 3.000 | 1.77600 | 50.40 |
| 4 | 34.6336 | 20.248 | | |
| 5 | −75.2088 | 1.921 | 1.87269 | 40.73 |
| 6 | 69.9608 | 5.663 | 1.84661 | 23.78 |
| 7 | 155.0273 | 4.015 | | |
| 8 | 167.2084 | 15.409 | 1.77008 | 50.99 |
| 9 | −72.4251 | 1.910 | | |
| 10 | 293.3134 | 15.392 | 1.55309 | 45.05 |
| 11 | −59.3134 | 1.725 | 1.86182 | 32.20 |
| 12 | −161.2014 | 0.787 | | |
| 13 | 139.4703 | 1.423 | 1.88300 | 40.76 |
| 14 | 57.6342 | 13.923 | 1.54039 | 71.46 |
| 15 | −733.1409 | 7.120 | | |
| 16 | −787.2462 | 11.194 | 1.43875 | 94.93 |
| 17 | −62.2642 | 0.454 | | |
| 18 | 184.9554 | 6.661 | 1.43875 | 94.93 |
| 19 | −220.7365 | DD [19] | | |
| *20 | 52.5066 | 1.408 | 1.44282 | 88.80 |
| 21 | 26.3343 | 8.632 | | |
| 22 | −138.3142 | 1.200 | 1.69697 | 56.26 |
| 23 | 48.3182 | DD [23] | | |
| 24 | 90.7181 | 3.196 | 1.86309 | 39.54 |
| 25 | −380.4570 | DD [25] | | |
| 26 | −41.9144 | 1.305 | 1.63793 | 53.62 |
| 27 | 70.7686 | 3.658 | 1.85819 | 40.29 |
| 28 | −124.5144 | DD [28] | | |
| 29 (aperture stop) | ∞ | 0.265 | | |
| 30 | 169.8921 | 2.692 | 1.46555 | 85.00 |
| 31 | −120.1611 | 0.227 | | |
| 32 | 86.4249 | 2.093 | 1.75980 | 27.78 |
| 33 | 324.1785 | 14.055 | | |
| 34 | 125.7251 | 6.365 | 1.56779 | 65.21 |
| 35 | −27.3304 | 1.232 | 1.75106 | 52.89 |
| 36 | −278.3151 | 13.633 | | |
| 37 | 70.0963 | 5.428 | 1.56892 | 61.56 |
| 38 | −41.3330 | 0.187 | | |
| 39 | 42.1502 | 7.343 | 1.66098 | 58.45 |
| 40 | −24.6401 | 1.200 | 1.86012 | 38.23 |
| 41 | 22.3294 | 1.655 | | |
| 42 | 42.1646 | 7.805 | 1.46314 | 71.96 |
| 43 | −16.1936 | 1.200 | 1.86237 | 40.89 |
| 44 | 1897.9531 | 2.318 | | |
| 45 | 164.8672 | 8.441 | 1.49839 | 80.25 |
| 46 | −21.6206 | 0.000 | | |
| 47 | ∞ | 3.700 | 1.51633 | 64.14 |
| 48 | ∞ | 29.500 | | |

TABLE 23

Example 8: Other Data

|  | Wide Angle End | Telephoto End |
|---|---|---|
| Zoom Ratio | 1.0 | 2.1 |
| f | 10.35 | 22.04 |
| Bf | 31.95 | 31.95 |
| F No. | 2.66 | 2.66 |
| 2ω (°) | 115.8 | 70.0 |
| DD [9] | 1.91 | 1.91 |
| DD [15] | 7.12 | 7.12 |
| DD [19] | 2.02 | 48.62 |
| DD [23] | 9.55 | 10.70 |
| DD [25] | 29.44 | 5.25 |
| DD [28] | 26.58 | 3.01 |

TABLE 24

Example 8: Aspherical Surface Data

| | Surface Number | | |
|---|---|---|---|
| | 1 | 3 | 20 |
| KA | 1.0000000E+00 | 1.0000000E+00 | 1.0000000E+00 |
| A3 | 0.0000000E+00 | 0.0000000E+00 | 0.0000000E+00 |
| A4 | 4.3035485E−06 | −3.8293724E−06 | 2.1741748E−06 |
| A5 | 0.0000000E+00 | 0.0000000E+00 | 0.0000000E+00 |
| A6 | −2.1387402E−09 | −1.4243176E−09 | 1.7935823E−09 |
| A7 | 0.0000000E+00 | 0.0000000E+00 | 0.0000000E+00 |
| A8 | 9.6363820E−13 | 2.8103137E−12 | −4.0611399E−12 |
| A9 | 0.0000000E+00 | 0.0000000E+00 | 0.0000000E+00 |
| A10 | −2.4855294E−16 | −1.4856811E−15 | 1.0576170E−14 |
| A11 | 0.0000000E+00 | 0.0000000E+00 | 0.0000000E+00 |
| A12 | 3.0710880E−20 | 2.9821812E−19 | −7.8733976E−18 |
| A13 | 0.0000000E+00 | 0.0000000E+00 | 0.0000000E+00 |
| A14 | 0.0000000E+00 | 0.0000000E+00 | 0.0000000E+00 |
| A15 | 0.0000000E+00 | 0.0000000E+00 | 0.0000000E+00 |
| A16 | 0.0000000E+00 | 0.0000000E+00 | 0.0000000E+00 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

In addition, Table 25 shows values corresponding to Conditional Formula (1) for Examples 1 through 8. As can be understood from Table 25, the values of each Example are within the numerical range defined by Conditional Formula (1).

TABLE 25

|  | Example 1 | Example 2 | Example 3 | Example 4 | Example 5 | Example 6 | Example 7 | Example 8 |
|---|---|---|---|---|---|---|---|---|
| u'/u | 0.35 | 0.34 | 0.33 | 0.33 | 0.34 | 0.35 | 0.33 | 0.35 |

[Aberration Performance]

Figure 10:
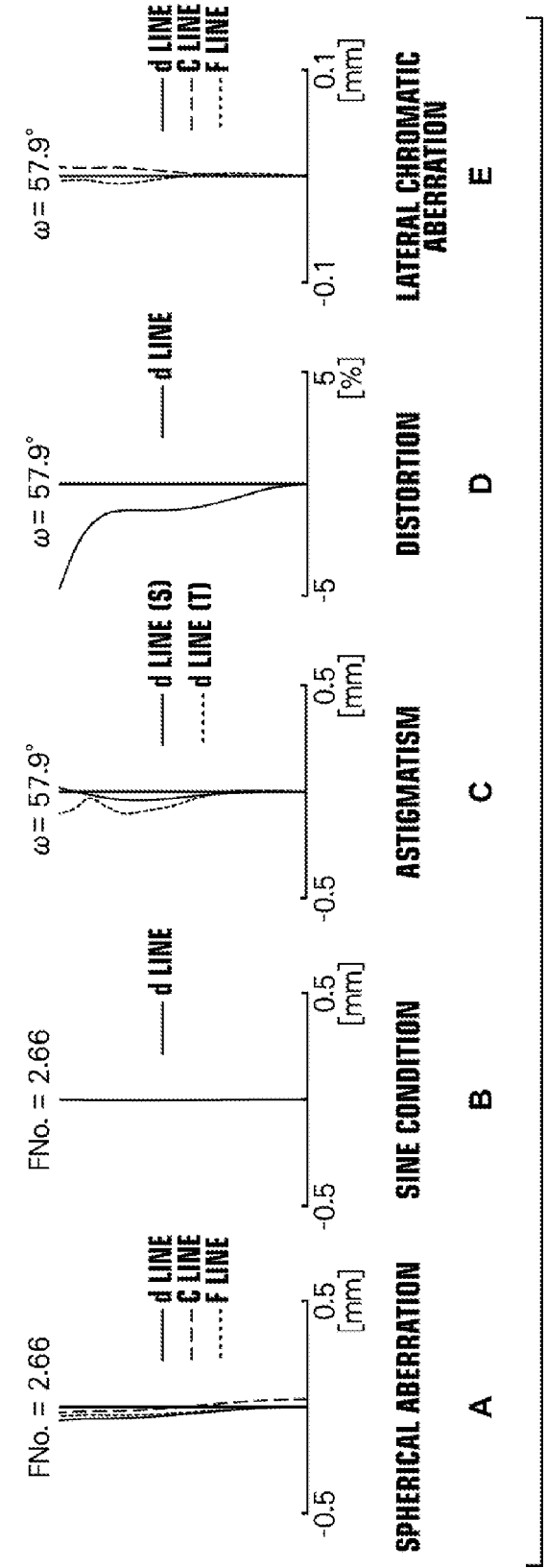
FIG. 10 is a collection of diagrams that illustrate aberrations of the zoom lens of Example 1 at the wide angle end, wherein A illustrates spherical aberration, B illustrates sine conditions, C illustrates astigmatic aberration (field curvature), D illustrates distortion, and E illustrates lateral chromatic aberration.
Figure 11:
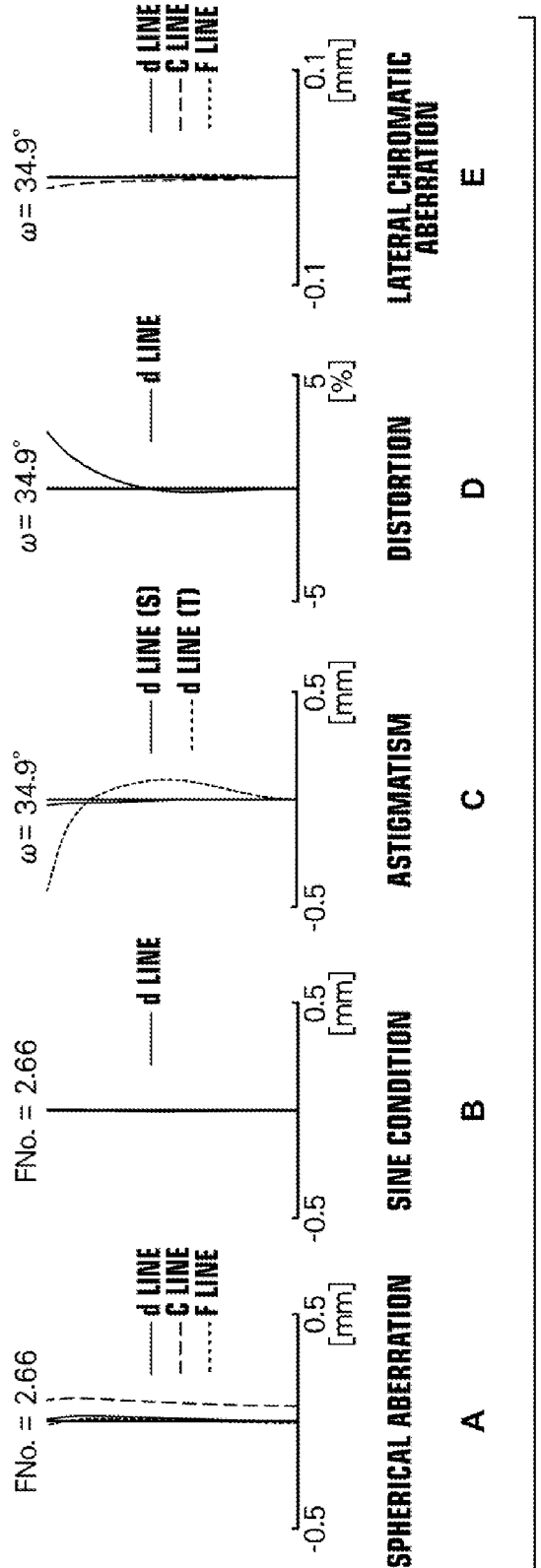
FIG. 11 is a collection of diagrams that illustrate aberrations of the zoom lens of Example 1 at the telephoto end, wherein A illustrates spherical aberration, B illustrates sine conditions, C illustrates astigmatic aberration (field curvature), D illustrates distortion, and E illustrates lateral chromatic aberration.

A through E of FIG. 10 are diagrams that illustrate the spherical aberration, the sine conditions, the astigmatic aberration, the distortion, and the lateral chromatic aberration of the zoom lens of Example 1 at the wide angle end, respectively. A through E of FIG. 11 are diagrams that respectively illustrate the same aberrations at the telephoto end. Each of the diagrams that illustrate aberrations show aberrations using the d line (wavelength: 587.6 nm) as a standard wavelength. The diagrams that illustrate spherical aberration and lateral chromatic aberration also show aberrations related to the C line (wavelength: 656.3 nm) and the F line (wavelength: 486.1 nm). In the diagrams that illustrate astigmatic aberration, aberration in the sagittal direction is indicated by a solid line, while aberration in the tangential direction is indicated by a broken line. In addition, "FNo." denotes F numbers, and "ω." denotes half angles of view.

Figure 12:
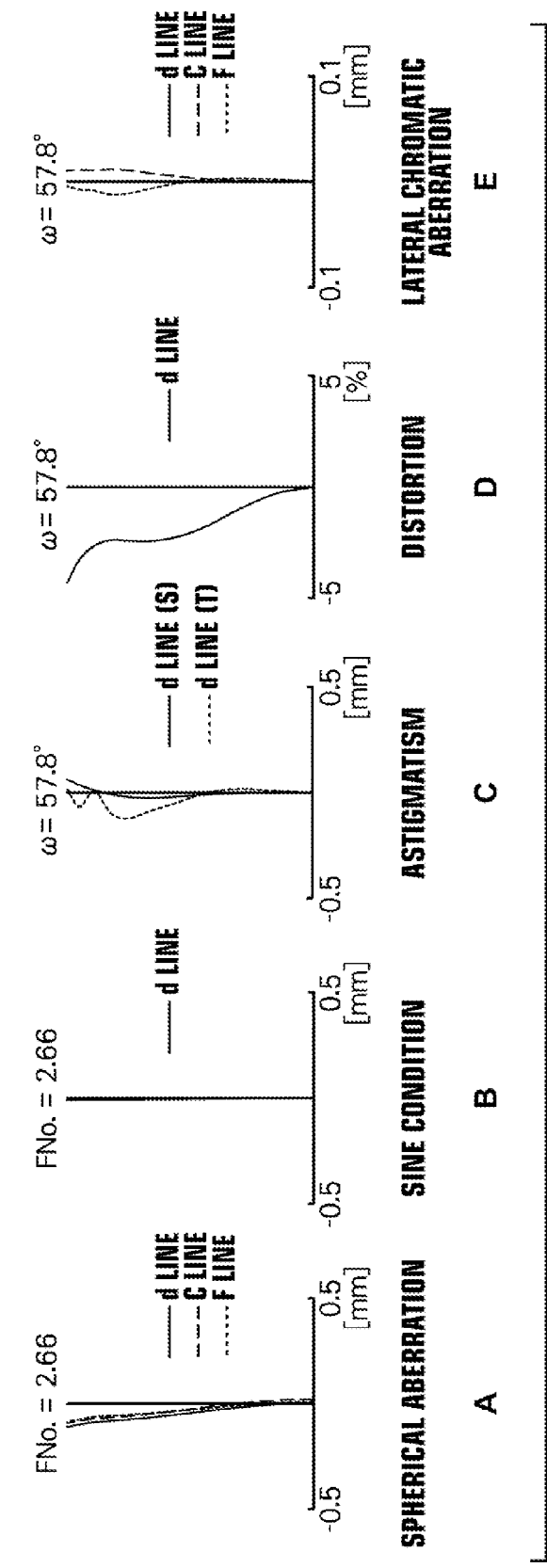
FIG. 12 is a collection of diagrams that illustrate aberrations of the zoom lens of Example 2 at the wide angle end, wherein A illustrates spherical aberration, B illustrates sine conditions, C illustrates astigmatic aberration (field curvature), D illustrates distortion, and E illustrates lateral chromatic aberration.
Figure 13:
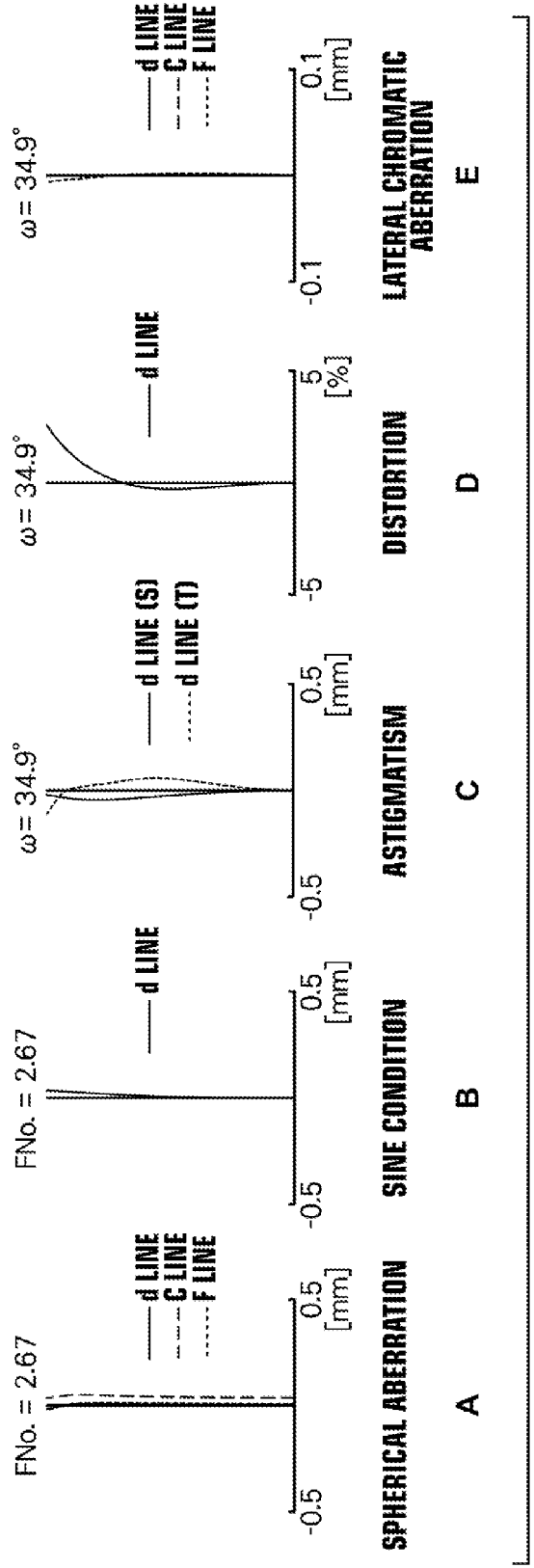
FIG. 13 is a collection of diagrams that illustrate aberrations of the zoom lens of Example 2 at the telephoto end, wherein A illustrates spherical aberration, B illustrates sine conditions, C illustrates astigmatic aberration (field curvature), D illustrates distortion, and E illustrates lateral chromatic aberration.
Figure 14:
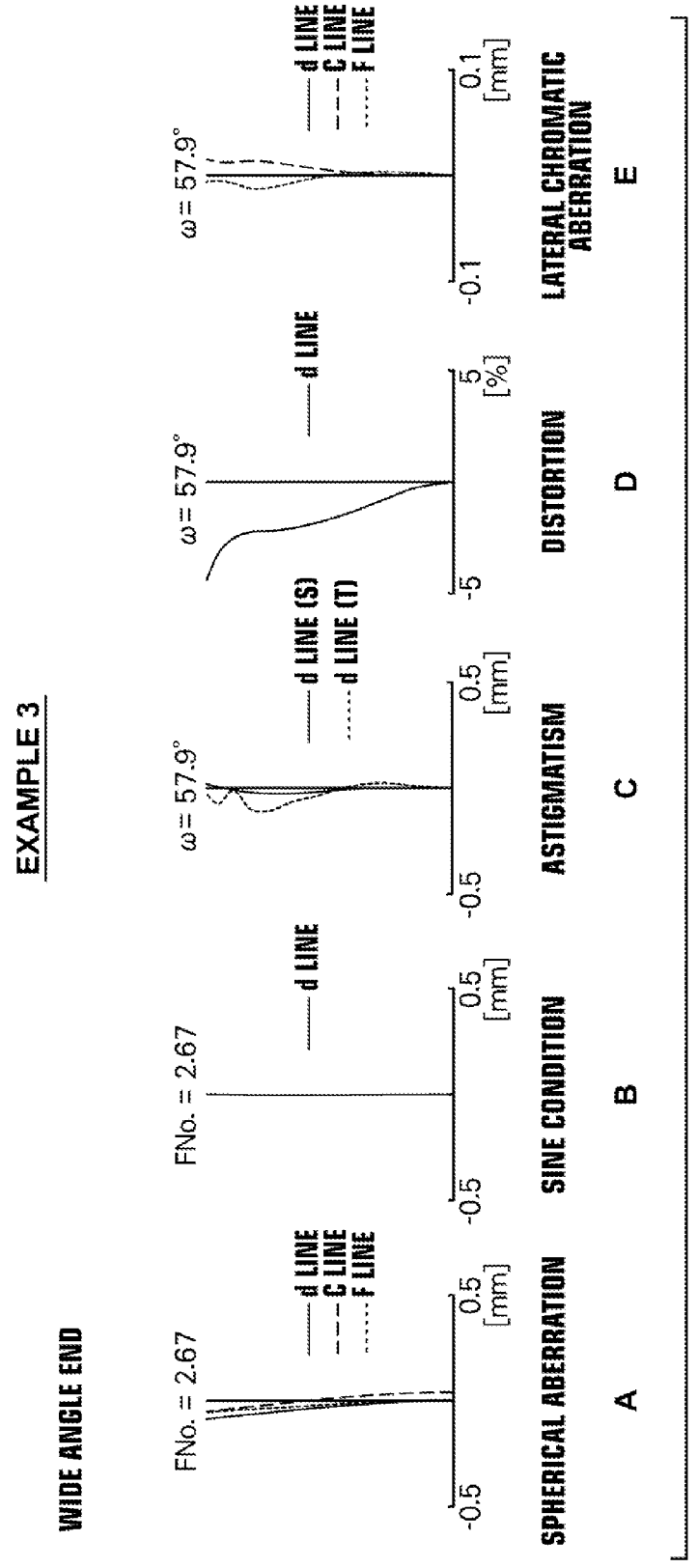
FIG. 14 is a collection of diagrams that illustrate aberrations of the zoom lens of Example 3 at the wide angle end, wherein A illustrates spherical aberration, B illustrates sine conditions, C illustrates astigmatic aberration (field curvature), D illustrates distortion, and E illustrates lateral chromatic aberration.
Figure 15:
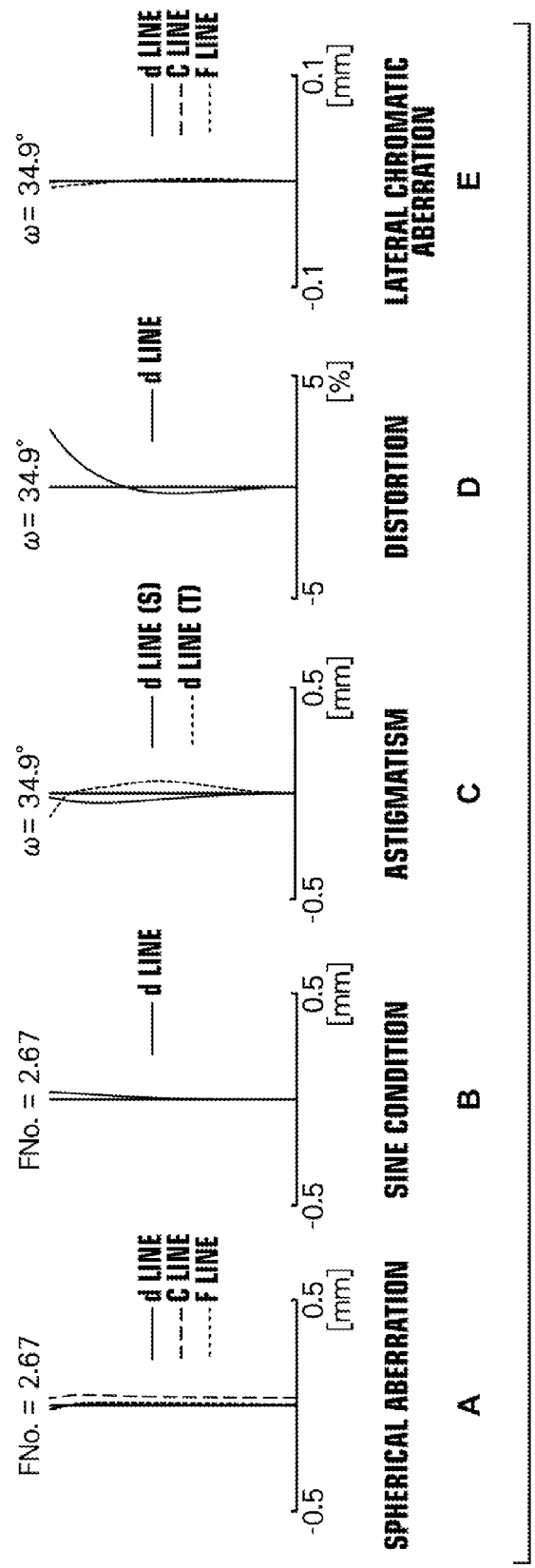
FIG. 15 is a collection of diagrams that illustrate aberrations of the zoom lens of Example 3 at the telephoto end, wherein A illustrates spherical aberration, B illustrates sine conditions, C illustrates astigmatic aberration (field curvature), D illustrates distortion, and E illustrates lateral chromatic aberration.
Figure 16:
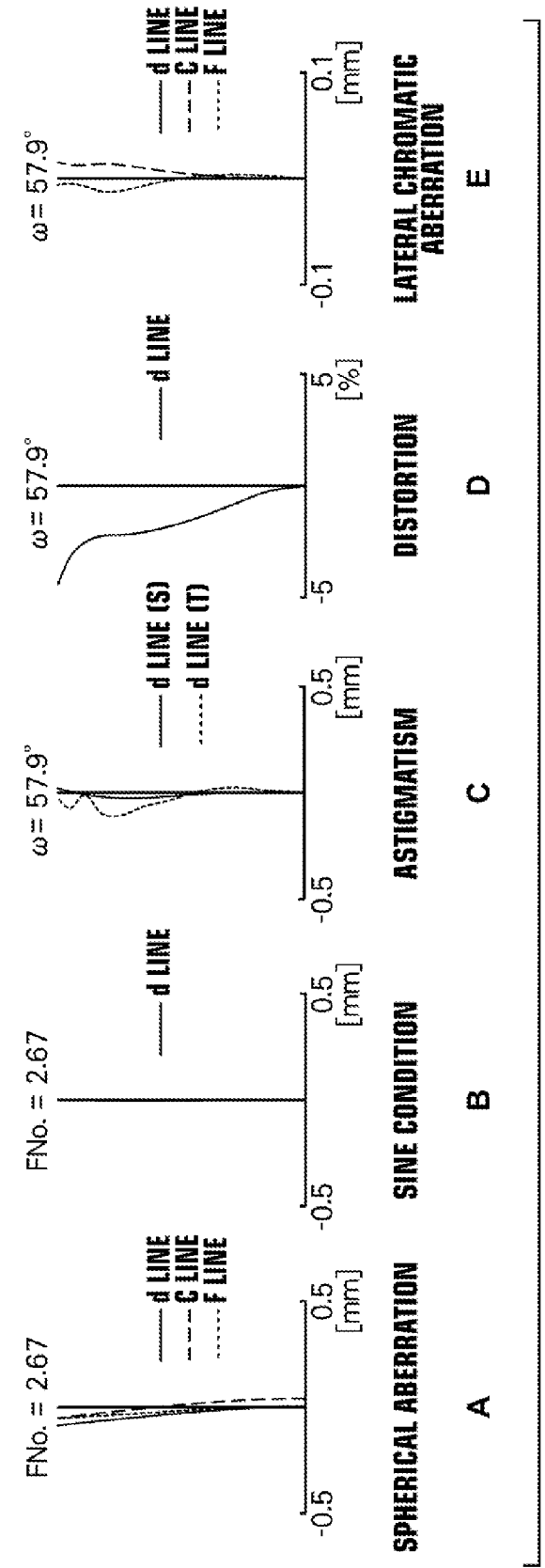
FIG. 16 is a collection of diagrams that illustrate aberrations of the zoom lens of Example 4 at the wide angle end, wherein A illustrates spherical aberration, B illustrates sine conditions, C illustrates astigmatic aberration (field curvature), D illustrates distortion, and E illustrates lateral chromatic aberration.
Figure 17:
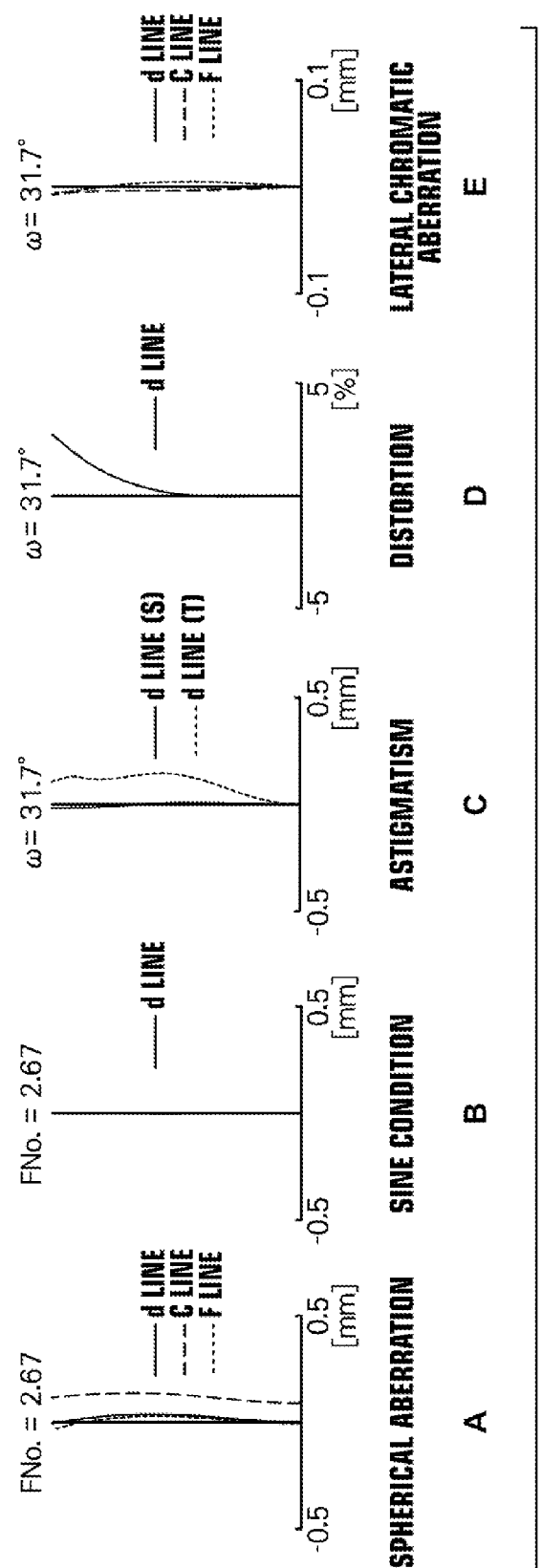
FIG. 17 is a collection of diagrams that illustrate aberrations of the zoom lens of Example 4 at the telephoto end, wherein A illustrates spherical aberration, B illustrates sine conditions, C illustrates astigmatic aberration (field curvature), D illustrates distortion, and E illustrates lateral chromatic aberration.
Figure 18:
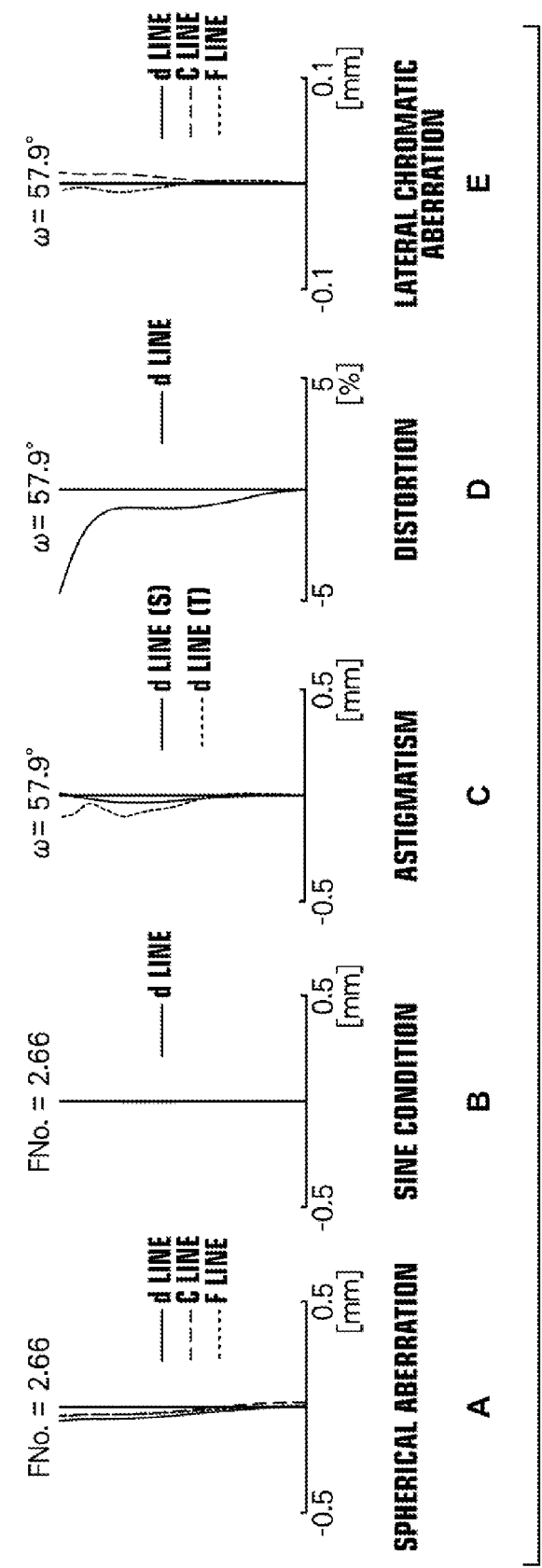
FIG. 18 is a collection of diagrams that illustrate aberrations of the zoom lens of Example 5 at the wide angle end, wherein A illustrates spherical aberration, B illustrates sine conditions, C illustrates astigmatic aberration (field curvature), D illustrates distortion, and E illustrates lateral chromatic aberration.
Figure 19:
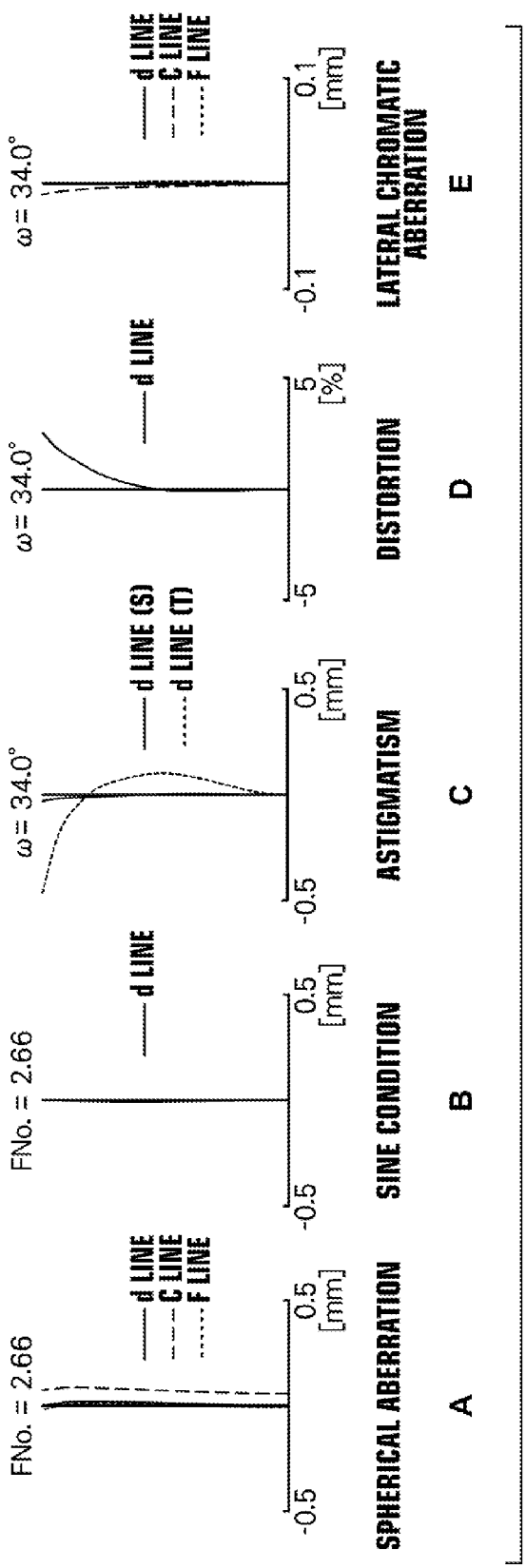
FIG. 19 is a collection of diagrams that illustrate aberrations of the zoom lens of Example 5 at the telephoto end, wherein A illustrates spherical aberration, B illustrates sine conditions, C illustrates astigmatic aberration (field curvature), D illustrates distortion, and E illustrates lateral chromatic aberration.
Figure 20:
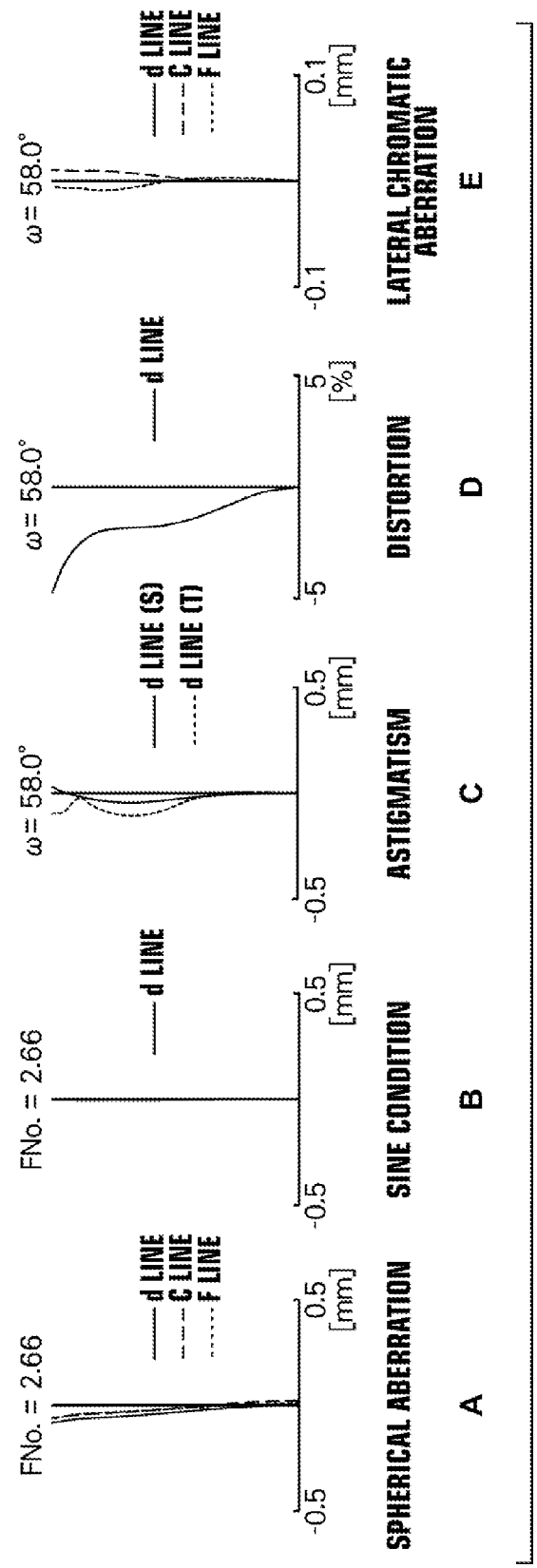
FIG. 20 is a collection of diagrams that illustrate aberrations of the zoom lens of Example 6 at the wide angle end, wherein A illustrates spherical aberration, B illustrates sine conditions, C illustrates astigmatic aberration (field curvature), D illustrates distortion, and E illustrates lateral chromatic aberration.
Figure 21:
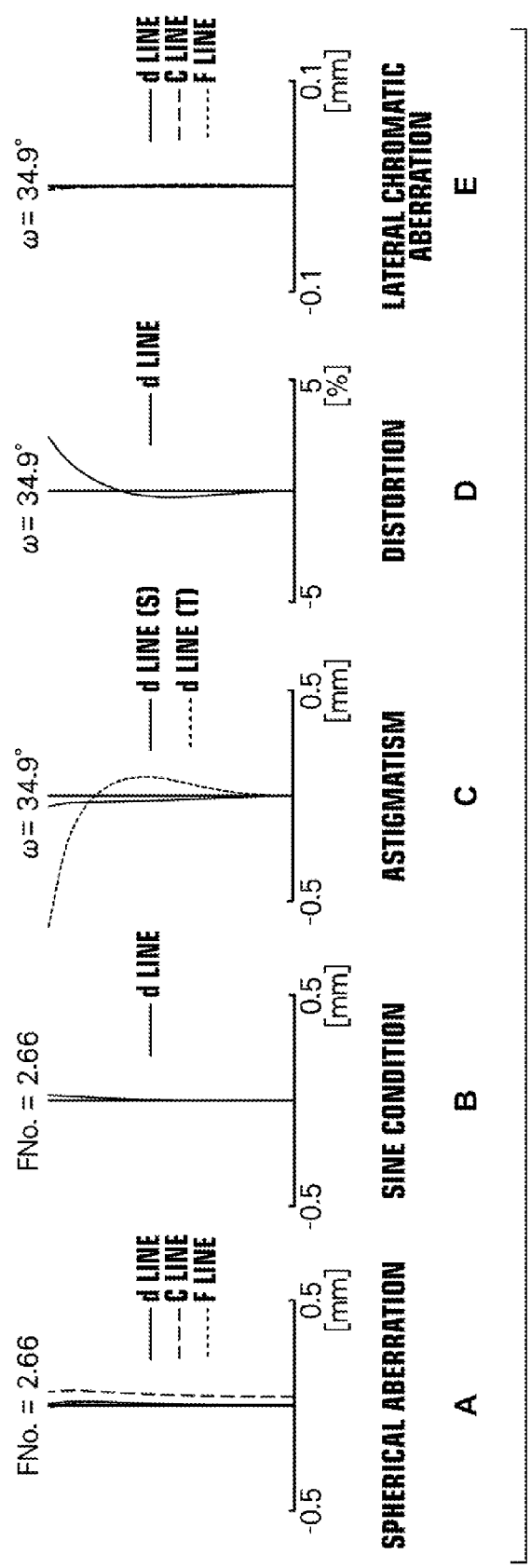
FIG. 21 is a collection of diagrams that illustrate aberrations of the zoom lens of Example 6 at the telephoto end, wherein A illustrates spherical aberration, B illustrates sine conditions, C illustrates astigmatic aberration (field curvature), D illustrates distortion, and E illustrates lateral chromatic aberration.
Figure 22:
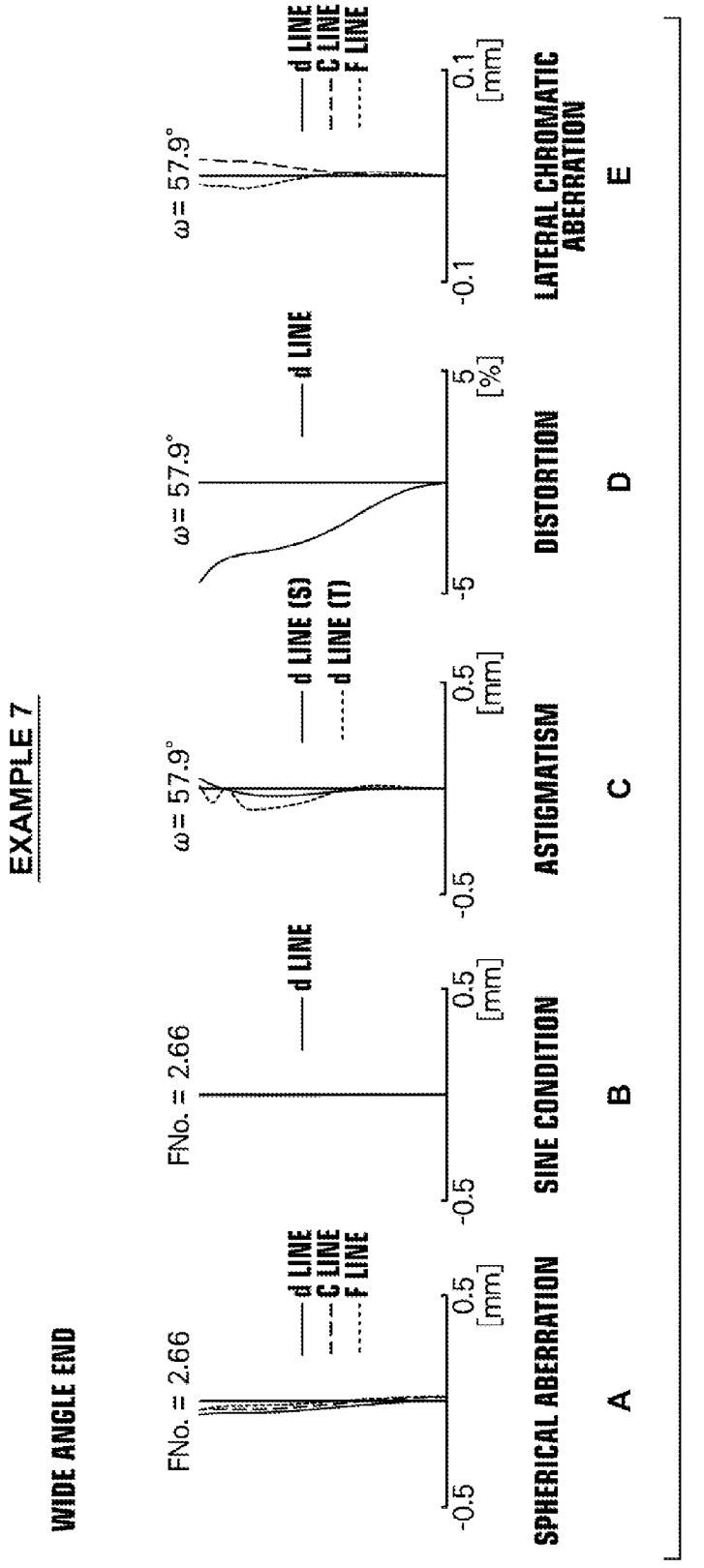
FIG. 22 is a collection of diagrams that illustrate aberrations of the zoom lens of Example 7 at the wide angle end, wherein A illustrates spherical aberration, B illustrates sine conditions, C illustrates astigmatic aberration (field curvature), D illustrates distortion, and E illustrates lateral chromatic aberration.
Figure 23:
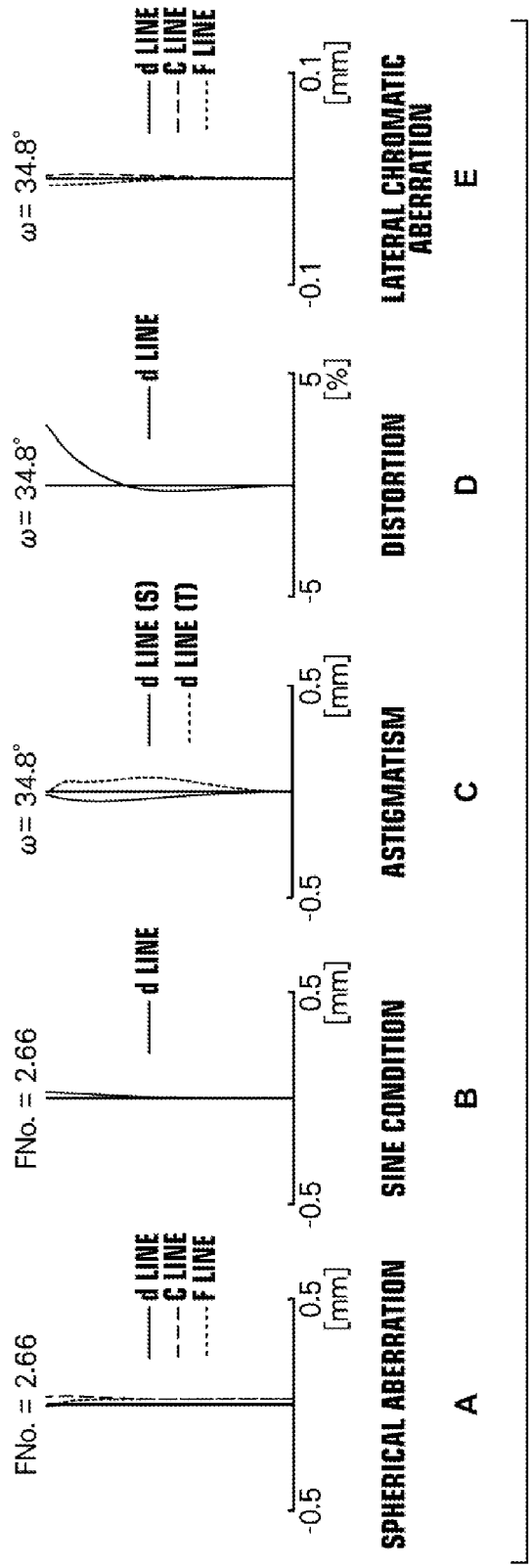
FIG. 23 is a collection of diagrams that illustrate aberrations of the zoom lens of Example 7 at the telephoto end, wherein A illustrates spherical aberration, B illustrates sine conditions, C illustrates astigmatic aberration (field curvature), D illustrates distortion, and E illustrates lateral chromatic aberration.
Figure 24:
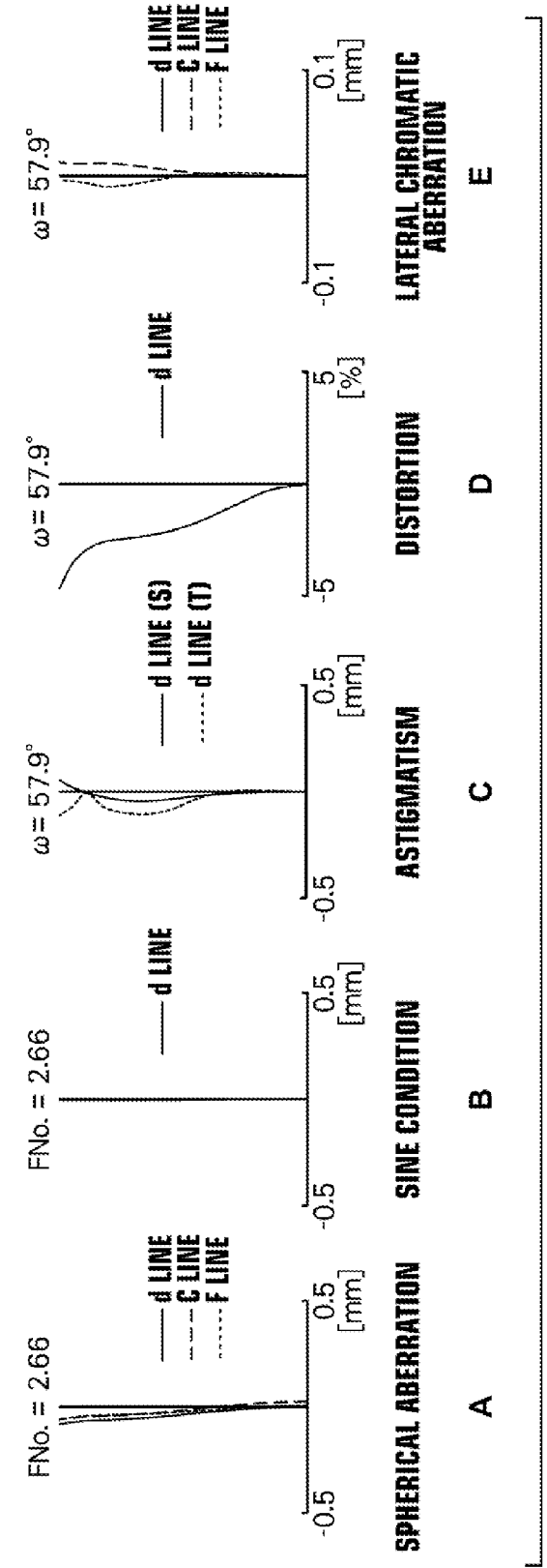
FIG. 24 is a collection of diagrams that illustrate aberrations of the zoom lens of Example 8 at the wide angle end, wherein A illustrates spherical aberration, B illustrates sine conditions, C illustrates astigmatic aberration (field curvature), D illustrates distortion, and E illustrates lateral chromatic aberration.
Figure 25:
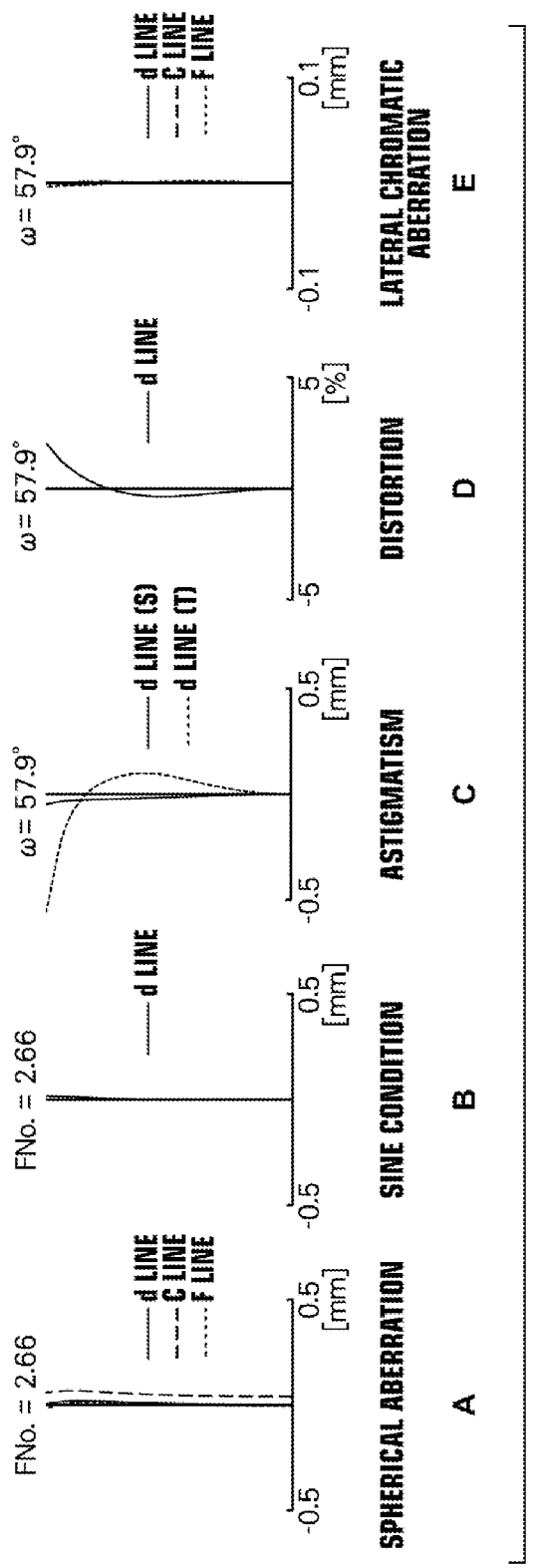
FIG. 25 is a collection of diagrams that illustrate aberrations of the zoom lens of Example 8 at the telephoto end, wherein A illustrates spherical aberration, B illustrates sine conditions, C illustrates astigmatic aberration (field curvature), D illustrates distortion, and E illustrates lateral chromatic aberration.

Similarly, the aberrations of the zoom lenses of Examples 2 through 8 are illustrated in A of FIG. 12 through E of FIG. 25.

As can be understood from each set of numerical value data and from the diagrams that illustrate aberrations, each of the Examples achieves extremely wide angles of view within a range from 115.6 to 116.0 degrees, which exceed 110 degrees, while favorably correcting various aberrations and realizing zoom lenses which are compact as a whole.

Note that the zoom lens of the present invention is not limited to the embodiments and Examples described above, and various modifications are possible. For example, the values of the radii of curvature, the distances among surfaces, and the refractive indices, etc., of each lens component are not limited to the numerical values indicated in connection with the Examples, and may be other values.

What is claimed is:

1. A zoom lens, substantially consisting of:
a first lens group having a positive refractive power which is fixed while changing magnification;
a second lens group constituted by two or more magnification changing groups;
an aperture stop; and
a third lens group having a positive refractive power which is fixed while changing magnification, provided in this order from an object side;
the magnification changing groups respectively moving along an optical axis while changing magnification from a wide angle end to a telephoto end; and
the zoom lens satisfying the following conditional formula:

$$u'/u < 0.5 \quad (1)$$

where u is the angle of inclination of a paraxial chief ray of light that enters the lens surface most toward the object side within the first lens group, and
u' is the angle of inclination of the paraxial chief ray of light that exits the lens surface most toward an image side within the first lens group.

2. The zoom lens as defined in claim 1, wherein:
a first lens (L111) having a negative refractive power and a concave surface at least toward the image side is provided most toward the object side within the first lens group, and a second lens (L112) having a negative refractive power and a concave surface at least toward the image side is provided immediately adjacent the first lens (L111) toward the image side thereof; and
the surface of the first lens (L111) toward the object side is aspherical.

3. The zoom lens as defined in claim 1, wherein:
a first lens (L111) having a negative refractive power and a concave surface at least toward the image side is provided most toward the object side within the first lens group, and a second lens (L112) having a negative refractive power and a concave surface at least toward the image side is provided immediately adjacent the first lens (L111) toward the image side thereof; and the surface of the second lens (L112) toward the object side is aspherical.

4. The zoom lens as defined in claim 1, wherein:

the lens most toward the image side within the first lens group is a lens having a positive refractive power and a convex surface toward the object side.

5. The zoom lens as defined in claim 1, wherein:

the first lens group is constituted by a first lens sub-group (G11) having a negative refractive power, a second lens sub-group (G12) having a positive refractive power, and a third lens a sub-group (G13) having a positive refractive power, provided in this order from the object side; and only the second lens sub-group (G12) moves toward the image side when focusing from an infinite distance to a close distance.

6. The zoom lens as defined in claim 5, wherein:

the first lens sub-group (G11) is constituted by five or more lenses that include three or more lenses having negative refractive powers.

7. The zoom lens as defined in claim 5, wherein:

the second lens sub-group (G12) is constituted at least by a lens having a positive refractive power, and a cemented lens formed by a lens having a negative refractive power and a lens having a positive refractive power, provided in this order from the object side.

8. The zoom lens as defined in claim 5, wherein:

the second lens a sub-group (G12) is constituted by a lens having a positive refractive power, a lens having a negative refractive power, and a cemented lens formed by a lens having a negative refractive power and a lens having a positive refractive power, provided in this order from the object side.

9. The zoom lens as defined in claim 5, wherein:

the third lens sub-group (G13) is constituted at least by two lenses having positive refractive powers, provided in this order from the object side.

10. The zoom lens as defined in claim 1, wherein:

the second lens group is constituted by a fourth lens sub-group (G21) having a negative refractive power, a fifth lens sub-group (G22) having a positive refractive power, and a sixth lens sub-group (G23) having a negative refractive power; and the distances among the fourth lens sub-group (G21), the fifth lens sub-group (G22), and the sixth lens sub-group (G23) are changed to change magnification.

11. The zoom lens as defined in claim 1, wherein:

the angle of view is greater than 110 degrees.

12. The zoom lens as defined in claim 1, wherein the following conditional formula is satisfied:

$$0.15 < u'/u < 0.4 \quad (1\text{-}3)$$

u being the angle of inclination of a paraxial chief ray of light that enters the lens surface most toward the object side within the first lens group, and u' being the angle of inclination of the paraxial chief ray of light that exits the lens surface most toward an image side within the first lens group.

13. An imaging apparatus equipped with the zoom lens as defined in claim 1.

14. A zoom lens, substantially consisting of:

a first lens group having a positive refractive power which is fixed while changing magnification;

a second lens group constituted by two or more magnification changing groups;

an aperture stop; and a third lens group having a positive refractive power which is fixed while changing magnification, provided in this order from an object side;

the magnification changing groups respectively moving along an optical axis while changing magnification from a wide angle end to a telephoto end; and the zoom lens satisfying the following conditional formula:

$$u'/u < 0.5 \quad (1)$$

u being the angle of inclination of a paraxial chief ray of light that enters the lens surface most toward the object side within the first lens group, and u' being the angle of inclination of the paraxial chief ray of light that exits the lens surface most toward an image side within the first lens group, wherein:

a first lens (L111) having a negative refractive power and a concave surface at least toward the image side is provided most toward the object side within the first lens group, and a second lens (L112) having a negative refractive power and a concave surface at least toward the image side is provided immediately adjacent the first lens (L111) toward the image side thereof; and the surface of the second lens (L112) toward the object side is aspherical.

15. A zoom lens, substantially consisting of:

a first lens group having a positive refractive power which is fixed while changing magnification;

a second lens group constituted by two or more magnification changing groups;

an aperture stop; and a third lens group having a positive refractive power which is fixed while changing magnification, provided in this order from an object side;

the magnification changing groups respectively moving along an optical axis while changing magnification from a wide angle end to a telephoto end; and the zoom lens satisfying the following conditional formula:

$$u'/u < 0.5 \quad (1)$$

u being the angle of inclination of a paraxial chief ray of light that enters the lens surface most toward the object side within the first lens group, and u' being the angle of inclination of the paraxial chief ray of light that exits the lens surface most toward an image side within the first lens group, wherein:

the second lens group is constituted by a first lens sub-group (G21) having a negative refractive power, a second lens sub-group (G22) having a positive refractive power, and a third lens sub-group (G23) having a negative refractive power; and the distances among the first lens sub-group (G21), the second lens sub-group (G22), and the third lens sub-group (G23) are changed to change magnification.

* * * * *